(12) United States Patent
Hoshino et al.

(10) Patent No.: US 7,859,615 B2
(45) Date of Patent: Dec. 28, 2010

(54) DISPLAY DEVICE HAVING ULTRAVIOLET RAY TRANSMITTING SMALL HOLES INCLUDED IN A WIRING ELECTRODE DISPOSED IN THE PERIPHERAL REGION OF THE DISPLAY BUT NOT WHERE A SEAL MEMBER IS DISPOSED

(75) Inventors: Koichi Hoshino, Saitama (JP); Yuichi Akiba, Sakado (JP); Sachiko Kawada, Kodaira (JP); Takashi Akiyama, Sayama (JP)

(73) Assignee: Citizen Holdings Co., Ltd., Tokyo (JP)

( * ) Notice: Subject to any disclaimer, the term of this patent is extended or adjusted under 35 U.S.C. 154(b) by 703 days.

(21) Appl. No.: 11/717,101

(22) Filed: Mar. 13, 2007

(65) Prior Publication Data

US 2007/0216830 A1    Sep. 20, 2007

(30) Foreign Application Priority Data

Mar. 15, 2006   (JP) .............................. 2006-070518

(51) Int. Cl.
*G02F 1/1333* (2006.01)
(52) U.S. Cl. .............................. 349/93; 349/86; 349/92; 349/153; 349/190
(58) Field of Classification Search ............. 349/86–94, 349/153, 154, 190
See application file for complete search history.

(56) References Cited

U.S. PATENT DOCUMENTS 6,750,937 B2 *   6/2004   Karasawa et al. ........... 349/153
7,394,515 B2 *   7/2008   Kwak et al. .................. 349/151

FOREIGN PATENT DOCUMENTS

JP    08-101405 A     4/1996
JP    2003-177427 A   6/2003

* cited by examiner

*Primary Examiner*—John Heyman
(74) *Attorney, Agent, or Firm*—Sughrue Mion, PLLC

(57) ABSTRACT

In a display apparatus that has a polymer dispersed liquid crystal material 25 encapsulated in a gap between a completed first substrate 1 and a completed second substrate 11 by using a sealing member 26 and has a display region M and a peripheral region N in a region where the polymer dispersed liquid crystal material 25 is encapsulated, a wiring electrode 19 having light shielding properties is provided in at least a part of the peripheral region N of the completed second substrate 11, and an ultraviolet ray transmitting portion 19a that transmits an ultraviolet ray therethrough is provided in the peripheral region where the wiring electrode 19 is provided. An ultraviolet ray is applied from the substrate side where the ultraviolet ray transmitting portion 19a is provided to polymerize a monomer in the peripheral region N. The ultraviolet ray transmitting portion is formed of, e.g., a plurality of small holes, and the small holes are dispersedly arranged at equal intervals.

12 Claims, 11 Drawing Sheets

DISPLAY DEVICE HAVING ULTRAVIOLET RAY TRANSMITTING SMALL HOLES INCLUDED IN A WIRING ELECTRODE DISPOSED IN THE PERIPHERAL REGION OF THE DISPLAY BUT NOT WHERE A SEAL MEMBER IS DISPOSED

BACKGROUND OF THE INVENTION

1. Field of the Invention

The present invention relates to a display apparatus, and, more particularly to a display apparatus that uses a polymer dispersed liquid crystal and a manufacturing method thereof.

2. Description of the Related Art

As liquid crystal display apparatus that uses a polymer dispersed liquid crystal does not utilize a polarizing plate, the apparatus has a characteristic in that the display image of the apparatus is bright. Therefore, it is used as a display apparatus in many devices or apparatuses. This polymer dispersed liquid crystal display apparatus irradiates a polymer material (hereinafter, "monomer") with an ultraviolet ray, the polymer material is photo-polymerized, cross-linked, polymerized, and is used by the display apparatus. Further, in an active matrix type display apparatus that uses such a polymer dispersed liquid crystal, a light shielding film, a wiring electrode, or a reflective layer is arranged on a substrate to display an image. Since the light shielding film of a black matrix, or the wiring electrode and the reflection film, both of which have reflective properties, blocks an ultraviolet ray when the monomer is irradiated, a problem of unpolymerization occurs in the monomer.

As a conventional technology that eliminates the occurrence of unpolymerization of the monomer, there is a technology disclosed in the following patent document 1.

One of technologies disclosed in patent document 1 provides a structure in which a light shielding layer is provided on an opposed substrate facing an array substrate having TFT elements and data lines provided thereon in parallel with the data lines so as to prevent light from being transmitted through the TFT elements and prevent light from being transmitted through positions on the opposed substrate corresponding to gaps between the data lines and pixel electrodes, and a light shielding area of the light shielding layer is reduced so that a monomer can be uniformly irradiated with an ultraviolet ray.

patent document 1: Japanese Patent Application Laid-Open Publication No. H8-101405 patent document 2: Japanese Patent Application Laid-Open Publication No. 2003-177427

A liquid crystal display apparatus generally has a configuration where a frame-like light shielding unit called a corner bead is provided in a peripheral region outside a display region where an image is displayed to prevent unnecessary light rays from leaking or prevent frame-like unnecessary light from leaking, thereby obtaining excellent display. The technology disclosed in patent document 1 concerns a configuration that eliminates unpolymerization of a monomer in a display region, and does not refer to the light shielding unit called a corner bead.

In a liquid crystal display apparatus that has a frame-like light shielding unit called a corner bead, an ultraviolet ray is prevented from being transmitted through the light shielding unit, and hence an unpolymerized part is produced in a monomer that is present in the light shielding unit. Further, such a quality phenomenon as depicted in FIG. 20 occurs. FIG. 20 is a plan view of the quality phenomenon in the liquid crystal display apparatus, and this apparatus has a problem that an unpolymerized monomer that is present in a light shielding unit 202 is exuded to a display region 201 for a long time such that an exuded portion 203 appears and this results in display unevenness of a display image. Furthermore, it also has a problem that a display quality is deteriorated.

In a method of manufacturing a liquid crystal display apparatus, a method of applying an ultraviolet ray from a display image visible side or a method of applying an ultraviolet ray from an opposite side of the visible side, i.e., a rear surface side of the liquid crystal display apparatus can be adopted, for example. However, a structure where a reflection film or a wiring electrode having light shielding properties is provided on a substrate facing a substrate having a light shielding unit called a corner bead provided thereon has a problem in that the reflection film or the wiring electrode is obstructive such that a monomer is not uniformly irradiated with the ultraviolet ray even if the method of applying the ultraviolet ray from the rear surface side of the liquid crystal display apparatus is carried out. The monomer at a position where it is not subject to irradiation with the ultraviolet ray remains in an unpolymerized state, the unpolymerized material exudes to a display region with time, and such a phenomenon as depicted in FIG. 20 arises.

In view of the problems, an object of the present invention is to provide a structure of a liquid crystal display apparatus that enables sufficient photo polymerization of a monomer that is present in both a display region and a light shielding region even if an ultraviolet ray is applied from a display image visible side or an opposite rear surface side of the liquid crystal display apparatus, thereby polymerizing the monomer. Additionally, another object of the present invention is to provide a manufacturing method of polymerizing a monomer that is present in both a display region and a light shielding region by a single ultraviolet ray applying operation.

SUMMARY OF THE INVENTION

To solve the above problems, a first means of the present invention is a display apparatus that is formed by encapsulating a polymer dispersed liquid crystal material between a pair of substrates having opposing electrodes, and has a display region in a region where the polymer dispersed liquid crystal is encapsulated and a peripheral region positioned outside the display region, wherein a wiring electrode having electro conductive and light shielding properties is provided in at least a part of the peripheral region on one substrate of the pair of substrates, and an ultraviolet ray transmitting portion that allows transmission of an ultraviolet ray is provided in the peripheral region where the wiring electrode is provided.

To solve the above problems, a second means of the present invention is characterized by the ultraviolet ray transmitting portion according to the first means of the present invention, being formed by a plurality of first small holes provided in a part of the wiring electrode.

To solve the above problems, a third means of the present invention is characterized by the plurality of first small holes according to the second means of the present invention, being dispersed at equal intervals.

To solve the above problems, a fourth means of the present invention is characterized by the ultraviolet ray transmitting portion according to the first means of the present invention, being formed by a necessary gap provided between the display region and the wiring electrode.

To solve the above problems, a fifth means of the present invention is characterized by a light shielding member having a corner bead function being provided, wherein the peripheral region on the other substrate that opposes the substrate having the wiring electrode provided thereon, according to any one of the first to fourth means of the present invention, is provided with the light shielding member and the light shielding member is present at a part of the substrate opposing the part where the ultraviolet ray transmitting portion is provided.

To solve the above problems, a sixth means of the present invention is characterized by a transparent electrode being provided on an upper surface of the wiring electrode that is according to any one of the first to fifth means of the present invention.

To solve the above problems, a seventh means of the present invention is characterized by the wiring electrode according to any one of the first to sixth means of the present invention, being provided along a full circumference of the peripheral region.

To solve the above problems, an eighth means of the present invention is characterized by the light shielding member according to the fifth means of the present invention, having a transmitting unit that transmits the ultraviolet ray therethrough.

To solve the above problems, a ninth means of the present invention is characterized by the transmitting unit according to the eighth means of the present invention, being formed of a plurality of second small holes that are partially provided in the light shielding member.

To solve the above problems, a tenth means of the present invention is characterized by positions of the second small holes according to the second or ninth means of the present invention, deviating from and not overlapping positions of the first small holes provided in the wiring electrode.

To solve the above problems, an eleventh means of the present invention is characterized by the transmitting unit according to the eighth means of the present invention, being formed of a light wavelength selection transmitting member having characteristics of allowing transmission of the ultraviolet ray.

To solve the above problems, a twelfth means of the present invention is characterized by the light wavelength selection transmitting member according to the eleventh means of the present invention, being formed of a dielectric multilayer film.

To solve the above problems, a thirteenth means of the present invention is a display apparatus that is formed by encapsulating a polymer dispersed liquid crystal material between a pair of substrates having opposing electrodes by using a sealing member and has a display region in a region where the polymer dispersed liquid crystal is encapsulated and a peripheral region positioned outside the display region, wherein a reflection film is provided on one substrate of the pair of substrates, and the reflection film has an ultraviolet ray transmitting portion that transmits an ultraviolet ray therethrough in the peripheral region.

To solve the above problems, a fourteenth means of the present invention is a manufacturing method of a display apparatus that is formed by encapsulating a polymer dispersed liquid crystal material between a pair of substrates having opposing electrodes by using a sealing member, and has a display region in a region where the polymer dispersed liquid crystal is encapsulated and a peripheral region positioned outside the display region, the method including a step of providing a light shielding member having a transmitting unit that allows transmission of an ultraviolet ray to form a corner bead function in the peripheral region of one substrate of the pair of substrates; a step of providing a wiring electrode having electro conductive and light shielding properties in at least a part of the peripheral region of the other substrate opposing the substrate having the light shielding member provided thereon, and providing an ultraviolet ray transmitting portion that transmits the ultraviolet ray therethrough in the peripheral region where the wiring electrode is provided; a step of encapsulating the polymer dispersed liquid crystal material between the substrate having the light shielding member provided thereon and the substrate having the wiring electrode provided thereon by using a sealing member; and a step of polymerizing a monomer in the polymer dispersed liquid crystal material by arranging a member that has the polymer dispersed liquid crystal material encapsulated between the substrates by the sealing member between an ultraviolet ray irradiation device and a reflection plate, emitting an ultraviolet ray from the ultraviolet ray irradiation device toward the member, and using direct incident light of the ultraviolet ray that enters from the ultraviolet ray irradiation device and reflective light of the ultraviolet ray reflected from a reflection plate.

To solve the above problems, a fifteenth means of the present invention is characterized by the ultraviolet ray transmitting portion according to the fourteenth means of the present invention, being formed by a plurality of first small holes provided in a part of the wiring electrode.

To solve the above problems, a sixteenth means of the present invention is characterized by the plurality of first small holes according to the fifteenth means of the present invention, being dispersed at equal intervals.

To solve the above problems, a seventeenth means of the present invention is characterized by the ultraviolet ray transmitting portion according to the fourteenth means of the present invention, being formed by a necessary gap provided between the display region and the wiring electrode.

To solve the above problems, a eighteenth means of the present invention is characterized by a transparent electrode being provided on an upper surface of the wiring electrode that is according to any one of the fourteenth to seventeenth means of the present invention To solve the above problems, a nineteenth means of the present invention is characterized by the transmitting unit according to the fourteenth means of the present invention, being formed of a plurality of second small holes that are partially provided in the light shielding member.

To solve the above problems, a twentieth means of the present invention is characterized by positions of the second small holes according to the fifteenth, sixteenth, or nineteenth means of the present invention, deviating from and not overlapping positions of the first small holes provided in the wiring electrode.

To solve the above problems, a twenty-first means of the present invention is characterized by the transmitting unit of the light shielding member according to the fourteenth means of the present invention, being formed of a light wavelength selection transmitting member having characteristics of allowing transmission of the ultraviolet ray.

To solve the above problems, a twenty-second means of the present invention is characterized by the light wavelength selection transmitting member according to the twenty-first means of the present invention, being formed of a dielectric multilayer film.

As an effect of the invention, in the display apparatus according to the present invention, the electroconductive wiring electrode having light shielding properties is provided in a part of a peripheral region of one substrate in the display apparatus that has the polymer dispersed liquid crystal material encapsulated therein. The ultraviolet ray transmitting portion that allows an ultraviolet ray to be transmitted therethrough is provided in the peripheral region having the wiring electrode disposed therein. When the ultraviolet ray transmitting portion is provided in the peripheral region having the wiring electrode disposed therein, an ultraviolet ray can be applied from a substrate side where the wiring electrode is provided and transmitted through the ultraviolet ray transmitting portion so that the ultraviolet ray can strike on a polymer material (hereinafter, "monomer") in the polymer dispersed liquid crystal material. The monomer that is present in the peripheral region can be polymerized.

Here, multiple first small holes that are partially provided in the wiring electrode constitute the ultraviolet ray transmitting portion. When the small holes are dispersedly provided, the entire monomer in the peripheral region can be irradiated with an ultraviolet ray. When the small holes are dispersed at equal interval, the monomer can be uniformly irradiated with the ultraviolet rays, and an unpolymerized part does not occur in the monomer, thereby polymerizing the entire monomer.

A necessary gap provided between the display region and the wiring electrode constitutes the ultraviolet ray transmitting portion. A polymerization region where the monomer in the peripheral region can be polymerized by an amount corresponding to at least the necessary gap can be formed. The polymerization region can be provided near the display region.

According to the present invention, a light shielding member having a corner bead function is provided in the peripheral region of the substrate facing the substrate having the wiring electrode provided thereon. This light shielding member makes the ultraviolet ray transmitting portion invisible. The monomer in the peripheral region can be polymerized without deteriorating an appearance quality.

According to the present invention, the transparent electrode is provided on an upper surface of the wiring electrode. Since an electrical resistance increases when small holes are provided in the wiring electrode, this structure has an effect of lowering the increasing resistance. Providing the transparent electrode decreases the resistance. Providing the transparent electrode enables improving connectivity of a sealing member with respect to the wiring electrode as compared with a structure where the sealing member is directly connected with the wiring electrode.

When the wiring electrode is provided along a full circumference of the peripheral region, static electricity escapes through the wiring electrode, thereby obtaining a static electricity countermeasure effect.

According to the present invention, the light shielding member has a transmitting unit that allows transmission of ultraviolet rays. When the light shielding member has the transmitting unit, an ultraviolet ray can be applied from the substrate side where the light shielding member is provided to polymerize the monomer in the light shielding member formation region.

Here, multiple second small holes are selected as the transmitting unit. If the transmitting unit is indiscernible small holes, an appearance quality is not deteriorated. When the second small holes deviate from the first small holes provided in the wiring electrode so that they do not overlap each other, lights leaking from the second small holes are blocked before they become visible to the human eye.

As the transmitting unit, a light wavelength selection transmitting member having characteristics of transmitting ultraviolet rays therethrough is selected. When the light wavelength selection transmitting member that transmits ultraviolet rays therethrough and reflects visible lights is used, the ultraviolet rays can be transmitted. This light wavelength selection transmitting member may be used as the light shielding member, and it may be also partially provided in the light shielding member. A dielectric multilayer film is used as this light wavelength selection transmitting member.

According to the present invention, a reflection film is provided on one substrate in the display apparatus that has the polymer dispersed liquid crystal material encapsulated therein, and this reflection film has the ultraviolet ray transmitting portion that transmits ultraviolet rays therethrough in the peripheral region. When the ultraviolet ray transmitting portion is provided in the peripheral region of the substrate having the reflection film disposed thereon, the polymer material can be irradiated with the ultraviolet rays from the substrate side having the reflection film provided thereon, thereby polymerizing the monomer in the peripheral region.

In the manufacturing method of a display apparatus according to the present invention, the light shielding member having the ultraviolet ray transmitting unit is provided in the peripheral region of one substrate, the wiring electrode and the ultraviolet ray transmitting portion that allows transmission of ultraviolet rays are provided in a part of the peripheral region of the other substrate, the polymer dispersed liquid crystal material is encapsulated between both the substrates to form the display apparatus, and this display apparatus is arranged between the ultraviolet ray irradiation device and the reflection plate to apply the ultraviolet rays toward the display apparatus. Since the peripheral region of the display apparatus has the light shielding member having the transmitting unit and the ultraviolet ray transmitting portion, ultraviolet light emitted from the ultraviolet ray irradiation device is applied to the monomer in the display apparatus, and a part of the ultraviolet light is transmitted through the display apparatus, strikes the reflection plate, and is reflected by this reflection plate. The reflected light again enters the display apparatus to be applied to the monomer. Since the monomer is irradiated with the ultraviolet light from both sides, polymerization rapidly advances; the entire region of the monomer can be polymerized, thereby obtaining the polymer with a uniform quality. Since polymerization can be achieved by a single ultraviolet ray application from one side of the display apparatus, an effect, e.g., a reduction in an operation can be obtained. Even an irradiation apparatus that has a small ultraviolet ray output power can effect polymerization, and hence an effect of reducing a facility cost can be obtained. As explained above, the polymer material is irradiated with the ultraviolet rays, thus polymerizing the monomer in the peripheral region.

In the manufacturing method according to the present invention, the effect obtained by constituting the ultraviolet ray transmitting portion of the first small holes, the effect obtained by dispersedly providing the first small holes at equal intervals, the effect obtained by constituting the ultraviolet ray transmitting portion of the necessary gap between the display region and the wiring electrode, the effect obtained by providing the transparent electrode on the wiring electrode, the effect obtained by forming the transmitting unit in the light shielding member of the second small holes, the effect obtained by deviating the second small holes from the first small holes provided in the wiring electrode so that they do not overlap each other, the effect obtained by forming the transmitting unit in the light shielding member of the light wavelength selection transmitting member having characteristics of allowing transmission of ultraviolet rays, the effect obtained by using the dielectric multilayer film for the light wavelength selection transmitting member, and others are as explained above, and hence they are omitted herein.

DETAILED DESCRIPTION OF THE PREFERRED EMBODIMENTS

Figure 2:
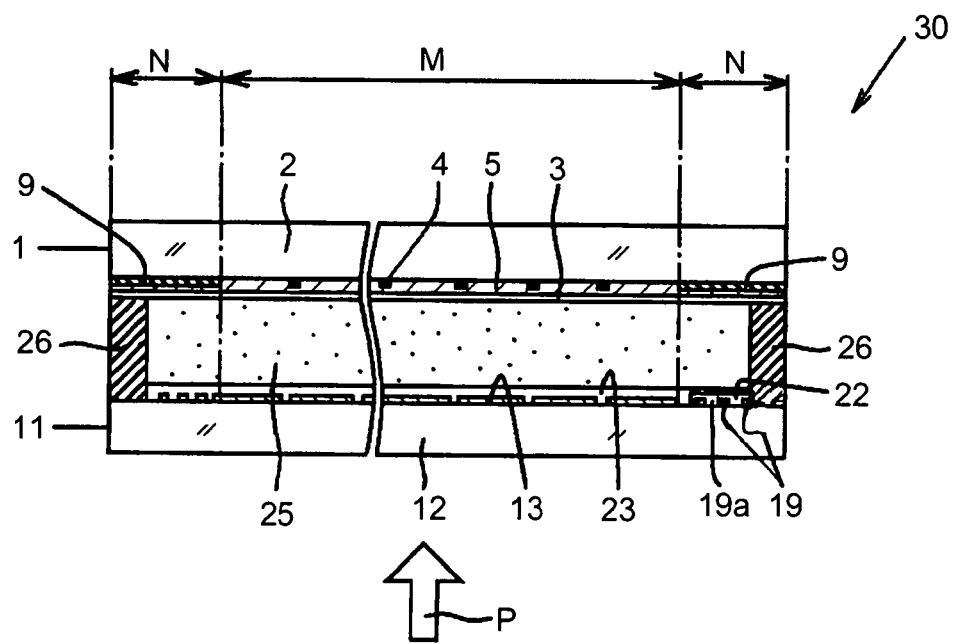
FIG. 2 is a cross-sectional view taken along a line A-A in FIG. 1.

To solve the problems, according to the present invention, a display apparatus that is formed by encapsulating a polymer dispersed liquid crystal material 25 between a pair of substrates (1 and 11) having opposed electrodes by a sealing member 26 and has a display region M in a region where the polymer dispersed liquid crystal material is encapsulated and a peripheral region N placed outside the display region is a display apparatus 30, wherein an electroconductive wiring electrode 19 having light shielding properties is provided in at least a part of the peripheral region N on one substrate (11) of the pair of substrates and the peripheral region N having the wiring electrode 19 provided therein has ultraviolet ray transmitting portions 19a that allows transmission of ultraviolet rays, the ultraviolet ray transmitting portions 19a being formed of multiple small holes (each of the small holes may have a circular shape, a square shape, a triangular shape, a polygonal shape, or a star shape), slits (they may have a rectangular shape or an elliptic shape), or notches (a side of the wiring electrode may be notched, or a center of a part close to the center of the wiring electrode 19 may be notched) partially provided in the wiring electrodes 19 (see FIG. 2).

To solve the problems, a manufacturing method of a display apparatus according to the present invention is a manufacturing method of a display apparatus 80 that is formed by encapsulating a polymer dispersed liquid crystal material 25 between a pair of substrates (51 and 61) having opposed electrodes by a sealing member 26 and has a display region M in a region where the polymer dispersed liquid crystal material 25 is encapsulated and a peripheral region N positioned outside the display region, the manufacturing method having: a step of providing a light shielding member 59 having a transmitting unit (59a) that allows transmission of ultraviolet rays in the peripheral region N on one substrate (51) of the pair of substrates (51 and 61) to provide a corner bead function; a step of providing an electroconductive wiring electrode 69 having light shielding properties in at least a part of the peripheral region N of the other substrate 61 facing the substrate having the light shielding member 59 provided thereon, and providing ultraviolet ray transmitting portions 69a that allow transmission of ultraviolet rays in the peripheral region N having the wiring electrode 69 provided thereon; a step of encapsulating the polymer dispersed liquid crystal material 25 between the substrate 51 having the light shielding member 59 provided thereon and the substrate 61 having the wiring electrode provided thereon by a sealing member 26; and a step of arranging a member (uncompleted display apparatus that is yet to be completed (e.g., 80-1)) having the polymer dispersed liquid crystal material 25 encapsulated in a gap between the substrates (51, 61) by the sealing member 26 between an ultraviolet ray irradiation device 300 that emits an ultraviolet ray and a reflection plate 310 and applying an ultraviolet ray from the ultraviolet ray irradiation device 300 toward the member (80-1) to polymerize a monomer in the polymer dispersed liquid crystal material 25 by direct incident light of the ultraviolet light that strikes on the monomer from the ultraviolet ray irradiation device 300 and reflected light of the ultraviolet ray reflected from the reflection plate 310. At this time, the ultraviolet ray transmitting portions 69a are formed of a plurality of holes that are partially provided in the wiring electrode 69. The ultraviolet ray transmitting portions 69a can be obtained by forming openings 69a or holes 69a that are small holes (they may have a circular shape, a square shape, a triangular shape, a polygonal shape, or a start shape), slits (they may have a rectangular shape or an elliptic shape), or notches (a side of the wiring electrode 69 may be notched, or the side of the wiring electrode 69 may be partially notched, or a center or a part close to the center of the wiring electrode 69 may be partially notched) partially provided in the wiring electrodes 69. A light shielding member 59 that has transmitting units (59a) that allow transmission of an ultraviolet ray to form a corner bead function is provided in the peripheral region N on the substrate 51. The transmitting units 59a are obtained by forming openings 59a, holes 59a, or notches 59a that are small holes (they may have a circular shape, a square shape, a triangular shape, a polygonal shape, or a star shape), slits (they may have a rectangular shape or an elliptic shape), or notches (a side of the light shielding member 59 may be notched, or the side of the light shielding member 59 may be partially notched, or a center or a part close to the center of the light shielding member 59 may be partially notched) partially provided in the light shielding member 59. However, when the openings are provided in the light shielding member 59, a size of each opening and a density and a density state of the openings must be appropriately set to avoid unnecessary light leakage. At this time, when a light shielding wiring electrode 69 or any other light shielding member is appropriately arranged on a completed second substrate 61, the light shielding wiring electrode 69 and any other light shielding member may be used as units that assist a light shielding function of the light shielding member 59 on a completed first substrate 51 (see FIG. 11) (see FIG. 14).

As an embodiment for carrying out the present invention, a first embodiment will be first explained with reference to FIGS. 1 to 7 in order. Here, FIG. 1 is a plan view of a display apparatus according to the first embodiment of the present invention, FIG. 2 is a cross-sectional view taken along a line A-A in FIG. 1, FIG. 3 is a plan view of a completed first substrate in FIG. 2, FIG. 4 is a plan view of a completed second substrate depicted in FIG. 2, and FIGS. 7A and 7B are an enlarged plan view and a cross-sectional view of a pixel electrode unit in a part B depicted in FIG. 4 where FIG. 7A is an enlarged plan view and FIG. 7B is a cross-sectional view taken along a line C-C in FIG. 7A.

A display apparatus 30 according to the first embodiment of the present invention is a display apparatus that uses a liquid crystal, and has a structure where a polymer dispersed liquid crystal material 25 is encapsulated in a gap between a completed first substrate 1 and a completed second substrate 11 arranged to face each other by using a sealing member 26 as depicted in FIG. 2. As shown in FIG. 1, the completed second substrate 11 has an extended portion 12a on one side thereof and is formed to be larger than the completed first substrate 1, and a liquid crystal driving IC 27 and a circuit substrate 28 as an FPC are provided on the extended portion 12a. This display apparatus 30 has an active matrix type display configuration. Although not depicted in FIG. 2, a transparent spacer, e.g., silica particles or plastic particles is dispersedly arranged between the completed first substrate 1 and the completed second substrate 11 to assure a necessary gap amount.

Figure 1:
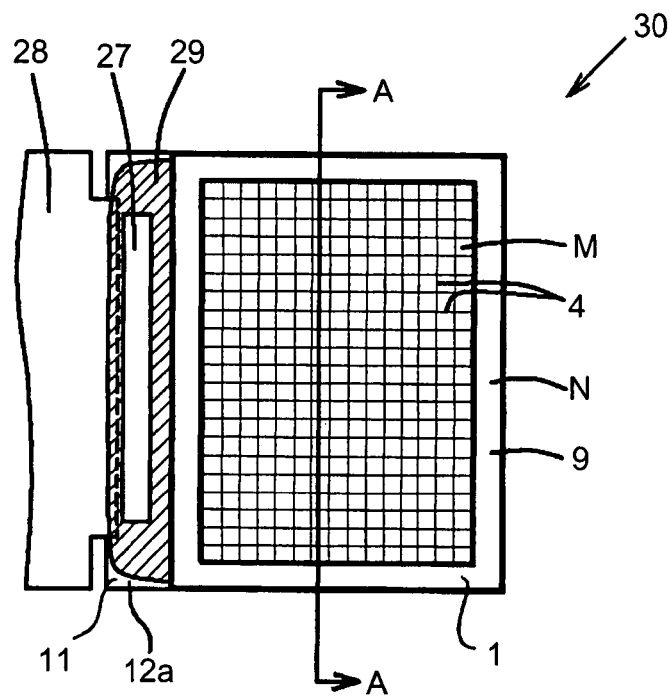
FIG. 1 is a plan view of a display apparatus according to a first embodiment of the present invention.

As shown in FIGS. 1 and 2, M denotes a display region, and it is a region where a display image can be seen, i.e., a region where a display image is displayed. A lattice-shaped black matrix 4 is provided in this display region M. N denotes a peripheral region, and a region that is placed outside the display region M and adjacent to the display region M is the peripheral region N. The completed first substrate 1 is placed on a display image visible side, and the peripheral region N is determined as an outer peripheral region of the completed first substrate 1 excluding the display region M. A light shielding member 9 is arranged along the peripheral region N of this completed first substrate 1 to provide a corner bead function. When the light shielding member 9 is arranged, unnecessary light leakage is eliminated, and a contour and others of a display image can be clearly visually recognized.

Figure 3:
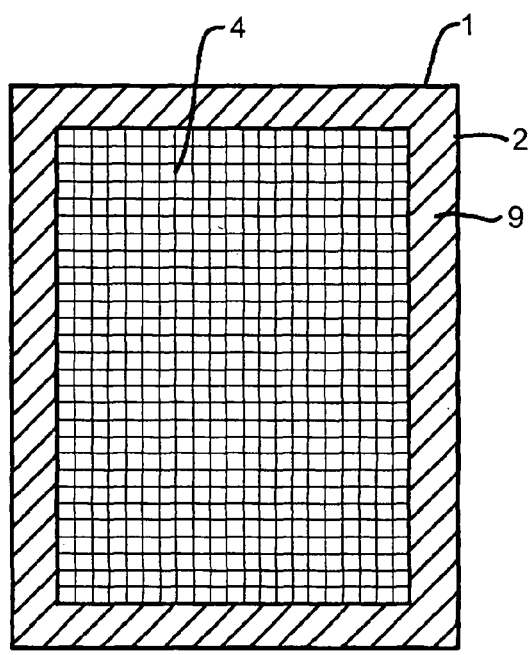
FIG. 3 is a plan view of a completed first substrate in FIG. 2.
Figure 4:
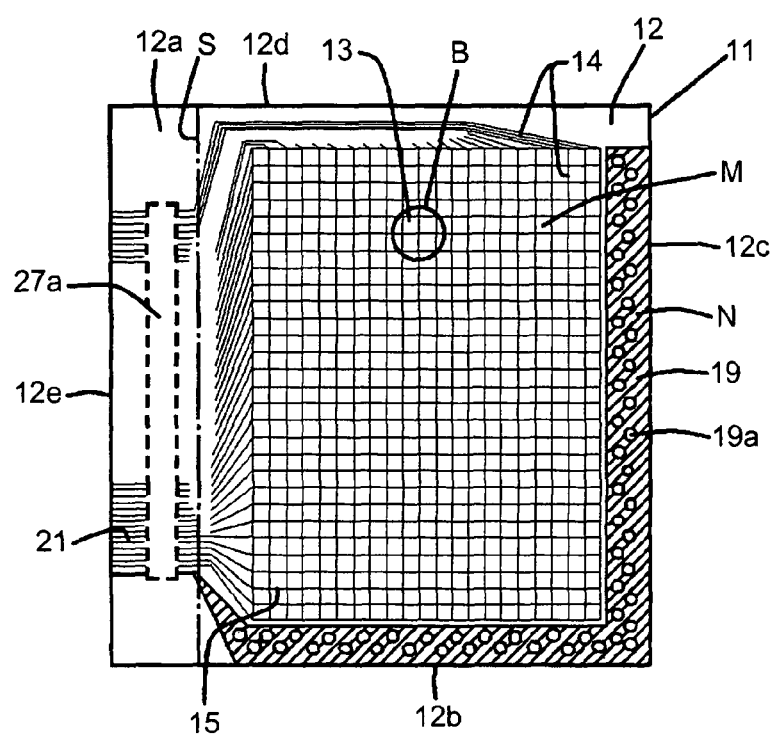
FIG. 4 is a plan view of a completed second substrate in FIG. 2.

Here, as shown in FIGS. 2 and 3, the completed first substrate 1 has a configuration where the black matrix 4 is provided in the display region M on a lower surface of a first substrate 2 formed of, e.g., transparent glass in a lattice pattern, the light shielding member 9 is provided in the peripheral region N, a flattening film 5 with an insulating function and a flattening function is provided thereon, and a first transparent electrode 3 formed of an ITO film is arranged on the flattening film 5. The black matrix 4 provided in the lattice pattern is provided at a part facing gate electrode lines, signal electrode lines, and TFT elements where the later-explained completed second substrate 11 is constituted.

Figure 5:
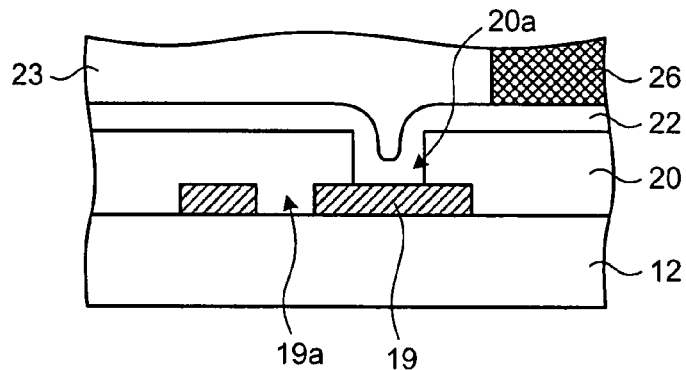
FIG. 5 is an enlarged view of a wiring electrode unit in FIG. 2.

The completed second substrate 11 is configured by using a second substrate 12 formed of, e.g., transparent glass, and a substrate larger than the first substrate 2 of the completed first substrate 1 is used. As shown in FIG. 4, on an outer side 12e of the second substrate 12, a part on a left side of an alternating long and short dashed line S is the extended portion 12a, and the second substrate 12 is larger than the first substrate 2 of the completed first substrate 1 at this extended portion 12a alone. An attachment portion 27a (a part indicated by a chain line in FIG. 4) where the driving IC (driving integrated circuit) 27 is attached, is provided on this extended portion 12a. The completed second substrate 11 has a plurality of lattice-like pixel electrode units 13 arranged in the display region M on an upper surface of the second substrate 12. The part where the pixel electrode units 13 are provided is the display region M. A pull wiring pattern of the gate electrode lines 14 and the signal electrode lines 15 collecting at a position of the attachment portion 27a for the driving IC 27 through the respective pixel electrode units 13 is arranged in the peripheral region N on an outer side 12d and the outer side 12e of the second substrate 12 neighboring the display region M. The wiring electrode 19 is arranged in the peripheral region on an outer side 12b and an outer side 12c. This wiring electrode 19 is connected with a first transparent electrode 3 of the completed first substrate 1 via electroconductive particles mixed in the hereinafter explained sealing member 26 to achieve electrical conduction, thereby supplying a voltage to the first transparent electrode 3. A connection electrode pattern 21 is arranged between the outer side 12e and the attachment portion 27a to achieve electrical conduction between the driving IC 27 and the circuit substrate 28 as the FPC. FIG. 4 shows a part of the pull wiring pattern of the gate electrode lines 14 and the signal electrode lines 15, and the connection electrode pattern 21, and the remainder is omitted. The wiring electrode 19 is formed of an aluminum (Al) metal film and has light shielding properties, and hence the ultraviolet ray transmitting portions 19a formed of the first small holes are dispersedly provided at uniform intervals. As shown in FIG. 2, a transparent electrode 22 formed of an ITO film is arranged on the wiring electrode 19 having the ultraviolet ray transmitting portions 19a provided therein. A protection insulating film 23 formed of a transparent resin is arranged on each pixel electrode unit 13 in the display region M, the wiring pattern provided in the peripheral region N, and the transparent electrode 22. FIG. 5 is a partially enlarged view of a connection portion of the wiring electrode 19, the transparent electrode 22, and the sealing member 26. As shown in FIG. 5, the wiring electrode 19 is formed on the second substrate 12, and an insulating film 20 covers its upper side. A contact hole 20a is provided in this insulating film, and the transparent electrode 22 is in contact with the wiring electrode 19 through this contact hole 20a. Each ultraviolet ray transmitting portion 19a is provided in the wiring electrode 19 on the display region M side apart from the contact hole 20a. Adopting such a structure enables the sealing member 26 to be electrically connected with the transparent electrode 22, thereby electrically connecting the transparent electrode 22 with the wiring electrode 19.

The pixel electrode unit 13 is formed of a pixel electrode using a TFT element 17. As shown in FIG. 7A, the pixel electrode unit 13 includes a gate electrode line 14 provided to control the TFT element 17, the signal electrode line 15 provided to apply an external signal to the TFT element 17, the TFT element 17 provided in a corner region where the gate electrode line 14 and the signal electrode line 15 cross each other, and a pixel electrode 16 provided to be connected with the TFT element 17. As shown in FIG. 7B, in the TFT element 17, a gate electrode 14a protruding sideways is provided on a part of the gate electrode line 14 formed of a tantalum (Ta) film, an insulating film 17f formed of a tantalum oxide (Ta2O5) as an anode oxide film of the gate electrode 14a is provided on the gate electrode 14a, and a semiconductor layer 17c formed of amorphous silicon (a-Si) is provided on and around the insulating film 17f. N-type amorphous silicon (N-type a-Si) 17d obtained by adding an impurity in amorphous silicon is provided on the semiconductor layer 17c in such a manner that it partially overlaps the gate electrode 14a, and a source electrode 17a connected with the signal electrode line 15 and formed of molybdenum (Mo) and a drain electrode 17b connected with the pixel electrode 16 and formed of molybdenum (Mo) are provided on the N-type amorphous silicon 17d. A protection insulating film 23 that also avoids, e.g., deterioration in characteristics of the semiconductor layer 17c is provided between the source electrode 17a and the drain electrode 17b on the semiconductor layer 17c. A processing layer 32 (e.g., an alignment film) that is used to regularly align molecules of the liquid crystal is provided on and around the protection insulating film 23. The processing layer 32 may be the protection insulating film 23 and an alignment film provided on the protection insulating film 23 (see FIG. 7B).

The black matrix 4 provided on the completed first substrate 1 is provided for the light shielding purpose of preventing light from leaking from a gap between the pixel electrodes 16 on the completed second substrate 11, and the light shielding purpose of preventing a light leakage current of the TFT element 17 from being produced. This black matrix 4 is provided at a position where it faces the gate electrode lines 14 and the signal electrode lines 15 and a position where it faces the TFT elements 17.

As a polymer dispersed liquid crystal material 25 in the display apparatus 30 according to the present invention, a liquid crystal material in a PNLC (Polymer Network Liquid Crystal) mode is used. This liquid crystal material in the PNLC mode is a mixed material containing a polymer material (hereinafter, "monomer") and a liquid crystal material (e.g., a nematic liquid crystal material), and the monomer is photo-polymerized by ultraviolet ray irradiation to be polymerized, thereby forming a polymer network having a three-dimensional network shape. The polymer material is irradiated with an ultraviolet ray to polymerize the monomer in the peripheral region. Then, the liquid crystal material in this polymer network is dispersed. When a voltage is applied to the first transparent electrode 3 on the completed first substrate 1 and each pixel electrode 16 on the completed second substrate 11, by the electric field intensity of the applied voltage, the liquid crystal molecules sandwiched between these members are aligned in such a manner that their long axes becomes parallel with a direction vertical to the electrodes, a refraction index of the liquid crystal molecules and a refraction index of the resin having the polymer network shape become equal to each other, and a transparent state is provided to allow transmission of light. On the other hand, in a part to which no voltage is applied, long axes of the liquid crystal molecules are aligned in random directions and enter a state that is similar to a state where the long axes are aligned in irregular directions from a macroscopic viewpoint. Therefore, the refractive index of the liquid crystal molecules is different from the refractive index of the resin having the polymer network shape, and hence light scatters. Accordingly, in the part to which no voltage is applied, a scattering state of light arises, and an opaque color tone appears. An image is displayed in the transparent part and the opaque part. The display apparatus that uses the polymer dispersed liquid crystal material has characteristics that a light transmission factor can be increased because no polarizing plate is used and a display image can be brightened. Since the polarizing plate and others are not used, an effect of reducing a thickness of the display apparatus can be also obtained.

The polymer dispersed liquid crystal material demonstrates the light transmission state (transparent) and the light scattering state (opaque) depending on the presence or absence of an electric field, and a liquid crystal in, e.g., a Polymer Network Liquid Crystal (PNLC) mode, a Polymer Dispersed Liquid Crystal (PDLC) mode, a Nematic Curvilinear Alined Phase (NCAP) mode, or a Polymer Stabilised Cholesteric Texture (PSCT) mode is known as such a dispersed liquid crystal. The first embodiment uses the liquid crystal material in the PNLC mode that can be driven with a low voltage. A small power consumption can suffice, and a life of, e.g., a battery can be increased, which is economical.

The main constituent components in the above configured display apparatus have the following specifications. Each of the first substrate 2 constituting the completed first substrate 1 and the second substrate 12 constituting the completed second substrate 11 is formed of transparent glass. As the glass, glass, e.g., soda glass, quartz glass, borosilicate glass, or common plate glass is used, and one having a thickness of 0.3 to 1.1 mm is adopted. However, the first substrate 2 or the second substrate 12 is not restricted to the glass, and a plastic plate and others can be also used.

According to the first embodiment, each of the black matrix 4 and the light shielding member 9 on the completed first substrate 1 is formed of a two-layered metal film including a metal film of a chrome oxide (CrO) and a metal film of chrome (Cr). These metal films can be formed by a dry plating method, e.g., a vacuum deposition method, a sputtering method, or an ion plating method. For example, when these films are formed by the vacuum deposition method, a deposition target (transparent substrate) is mounted on a mount base in a chamber, and a pressure at the time of deposition in the chamber of a vacuum deposition machine is set to $1 \times 10^{-6}$ to $5 \times 10^{-5}$ torr ($1.33 \times 10^{-4}$ to $6.65 \times 10^{-3}$ Pa) to effect vacuum deposition. Since a thickness is determined based on a deposition time, performing deposition until a necessary thickness is obtained can suffice. Then, after the two-layered metal film is formed, a necessary shape is formed by a photo-mask or a photo-etching method. The black matrix 4 and the light shielding member 9 are not necessarily restricted to the two-layered metal film including the metal film of a chrome oxide (CrO) and the metal film of chrome (Cr), and they may be formed of a single layer including a metal film of chrome or may be formed by using, e.g., a printing method utilizing a black ink.

The flattening film 5 on the completed first substrate 1 is provided to obtain insulation and flatness with respect to the first transparent electrode 3 provided thereon and the electro-conductive black matrix 4 or the light shielding member 9, and is formed by, e.g., a screen printing method, a roll coater method, or a spinner coating method utilizing a transparent epoxy resin, an acrylic resin, or an urethane resin.

Each of the first transparent electrode 3 on the completed first substrate 1 and the pixel electrode 16 on the completed second substrate 11 is formed of an ITO film of a tin-doped indium oxide. This ITO film is formed by, e.g., a vacuum deposition method, a sputtering method, or an ion plating method. According to this embodiment, the first transparent electrode 3 on the completed first substrate 1 is formed on the substantially entire surface of the first substrate 2, and each pixel electrode 16 on the completed second substrate 11 is formed with a necessary shape.

The wiring electrode 19 is formed of an aluminum (Al) metal film. This wiring electrode 19 is provided to reduce a resistance of electricity for the first transparent electrode 3, and forms a transfer structure to achieve electrical conduction of the first transparent electrode 3 on the completed first substrate 1 by electro conductive particles mixed in the hereinafter explained sealing member 26. Therefore, a smaller electrical resistance of this wiring electrode 19 is preferable. For this reason, according to a conventional technology, this wiring electrode 19 is configured to be as thick as possible and with an increased area. That is, forming holes in the wiring electrode 19 is not considered at all in the conventional technology. However, as explained above, when the wiring electrode is thick, the peripheral region N cannot be sufficiently irradiated with an ultraviolet ray. Thus, according to the embodiment of the present invention, the ultraviolet ray transmitting portions 19a formed of the first small holes are provided in this wiring electrode 19 to allow transmission of an ultraviolet ray. The ultraviolet ray transmitting portions 19a are provided to apply an ultraviolet ray from the completed second substrate 11 side (outside of the completed second substrate 11) having the wiring electrode 19 provided thereon, thereby polymerizing the monomer that is present in the light shielding member 9 on the completed first substrate 1. Since the peripheral region on this wiring electrode 19 is also a position at which the sealing member 26 is provided, the ultraviolet ray transmitting portions 19a are formed in a region excluding the region where the sealing member 26 is provided. According to this embodiment, the ultraviolet ray transmitting portions 19a are formed of a plurality of circular small holes. The small holes preferably have the same size and are formed at uniform intervals, an amount of transmitted light of an ultraviolet ray also becomes uniform when the small holes have the same size and are formed at uniform intervals, and the ultraviolet ray having a uniform light amount is applied to the monomer. Polymerization can be rapidly carried out.

The first small holes are not restricted to a specific shape in particular, and a circular shape, an oval shape, an elliptic shape, a square shape, or a polygonal shape can be adopted. The first small holes are not restricted to a specific size, and a size of each small hole and a total area of the first small holes are appropriately set in such a manner that an electrical resistance does not become considerably high. According to this embodiment, a numerical aperture indicative of the total area of the first small holes (the numerical aperture in this example means a ratio of a total area of the small holes with respect to an area of the region in which the small holes are formed) is set in the range of 30 to 40%. The fact that sufficient polymerization can be performed without considerably increasing an electrical resistance if the numerical aperture of the first small holes is 30% has been confirmed from results of various kinds of experiments.

A method of forming the wiring electrode 19 and the plurality of ultraviolet ray transmitting portions 19a provided in the wiring electrode 19 is as follows. An aluminum metal film is formed on the second substrate 12 of the completed second substrate 11 by using a vacuum deposition method, a sputtering method, or an ion plating method utilizing an aluminum metal. For example, when the aluminum metal film is formed by the vacuum deposition method, a pressure at the time of deposition in a chamber of a vacuum deposition machine is set to $1 \times 10^{-6}$ to $5 \times 10^{-5}$ torr ($1.33 \times 10^{-4}$ to $6.65 \times 10^{-3}$ Pa) to perform vacuum deposition. Since a thickness is determined based on a deposition time, performing deposition until a necessary thickness is obtained can suffice. Then, a resist film is formed on the aluminum metal film by a method, e.g., screen printing. Subsequently, exposure processing using an ultraviolet ray is carried out. According to the exposure processing, a positive photographic film having a shape of the wiring electrode 19 with the ultraviolet ray transmitting portions 19a drawn thereon is mounted on the resist film, and an ultraviolet ray is applied from above to effect exposure. The resist film at the part where the wiring electrode 19 is formed is hardened due to exposure, and the resist film at a position of each ultraviolet ray transmitting portion 19a is not hardened and remains in a soft state since it is not irradiated with the ultraviolet ray. Then, the soft resist film at the position of each ultraviolet ray transmitting portion 19a is dissolved by a dissolving liquid to be removed. As a result, the aluminum metal film placed at the position of at each ultraviolet ray transmitting portion 19a is exposed. The other hardened resist film at the position where the wiring electrode 19 is formed remains as it is. Then, the exposed aluminum metal film placed at the position of each ultraviolet ray transmitting portion 19a is etched by using an etchant and removed. Consequently, each ultraviolet ray transmitting portion 19a is formed. Then, the hardened resist film placed at the position where the wiring electrode 19 is formed is separated by using a separation liquid. As a result, the wiring electrode 19 having the ultraviolet ray transmitting portions 19a provided therein is brought to completion. This method is a method called a photo-mask method or a photo-etching method, and can form a very small hole of approximately 5 micrometers. A small hole with a desired shape can be also formed. When other constituent components, e.g., the pixel electrode unit 13 are already provided on the second substrate 12, masking is performed on an upper side of each of other constituent components so that the other constituent components are not affected, and then the wiring electrode 19 is formed.

The transparent electrode 22 made up of an ITO film is formed on the wiring electrode 19 having the ultraviolet ray transmitting portions 19a formed of the first small holes provided therein. This transparent electrode 22 is provided to suppress an increase in a resistance of the wiring electrode 19 due to provision of the ultraviolet ray transmitting portions 19a as openings, and is provided to not only the upper surface of the wiring electrode 19 but also at the position of each ultraviolet ray transmitting portion 19a. The transparent electrode 22 is provided to improve connectivity of electroconductive particles in the sealing member 26 with respect to the wiring electrode 19 beyond connectivity achieved by directly connecting the electroconductive particles mixed in the sealing member 26 with the wiring electrode 19.

According to the first embodiment, the connection electrode pattern 21 is formed of an ITO film. The ITO film is formed by a dry plating method, e.g., a vacuum deposition method, a sputtering method, or an ion plating method, and then this film is formed into a necessary shape by a photo-mask method or a photo-etching method.

The sealing member 26 is formed of a member obtained by mixing electroconductive particles (mixture of electroconductive particles and insulating particles may be used in some cases) in a thermosetting resin, e.g., an epoxy resin. The electroconductive particle having the same size as that of a spacer (not depicted) arranged in a gap between the completed first substrate 1 and the completed second substrate 11 is used (however, it does not have to have the same particle diameter, and the particle diameter can be appropriately set).

The electroconductive particles are obtained by providing an electroconductive metal film on surfaces of, e.g., silica particles or plastic particles. When the sealing member 26 is combined with the electroconductive particles, bonding the completed first substrate 1 and the completed second substrate 11 to each other can achieve electrical conduction in the first transparent electrode 3 of the completed first substrate 1 and the wiring electrode 19 of the completed second substrate 11. Then, a voltage is applied to the first transparent electrode 3 from the wiring electrode 19 through the electroconductive particles.

Figure 6:
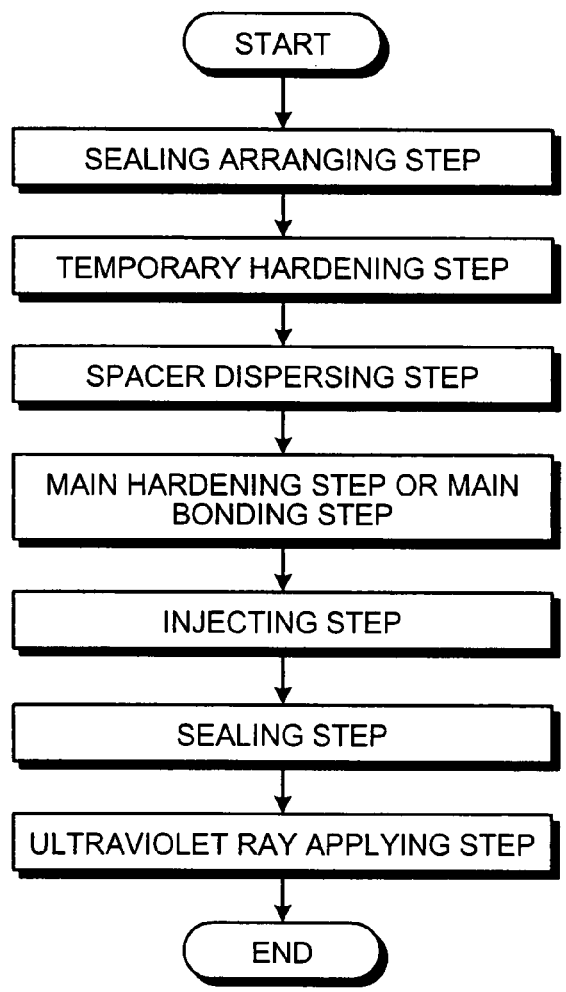
FIG. 6 is an explanatory drawing of a part of a process for explaining a manufacturing method of the display apparatus according to the first embodiment of the present invention.
Figure 7A:
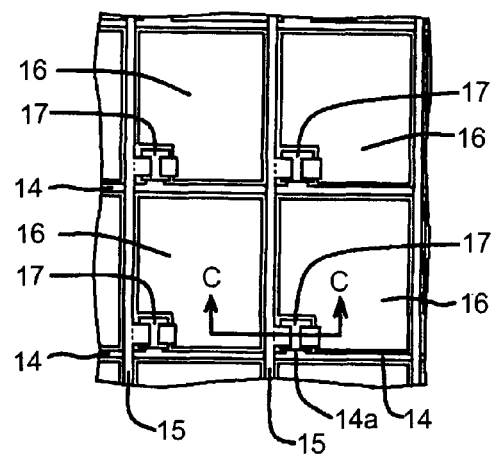
FIG. 7A is an enlarged plan view of a pixel electrode unit in a part B in FIG. 4.
Figure 7B:
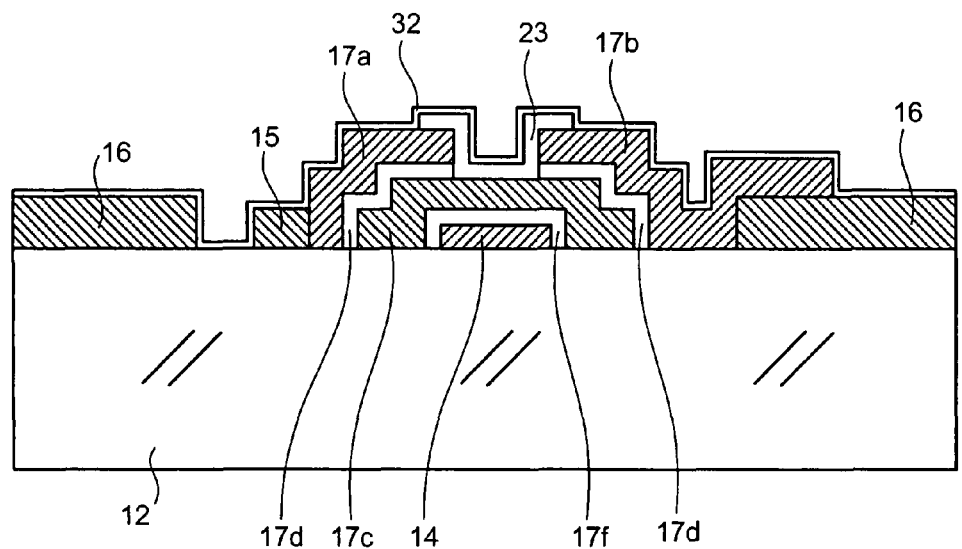
FIG. 7B is a cross-sectional view taken along a line C-C in FIG. 7A.

The above configured display apparatus 30 is manufactured as depicted in FIG. 6. At first, the sealing member 26 is printed on at least one of the completed first substrate 1 and the completed second substrate 11 by a method, e.g., screen printing (sealing arrangement step). At this time, an opening serving as a filling opening for the polymer dispersed liquid crystal material 25 is provided at one position. Then, the sealing member 26 is half-hardened at a temperature of approximately 80° C. (temporary hardening step), and a disperser is used to disperse a spacer on the substrate in the half-hardened state (spacer dispersing step). As the dispersing method, a wet dispersing method or a dry dispersing method can be used. Then, the completed first substrate 1 and the completed second substrate 11 are arranged to face each other, are heated in a baking furnace under a pressure from a pressure device, e.g., an air bag to harden the sealing member 26 (main hardening step or main bonding step), and the completed first substrate 1 and the completed second substrate 11 are bonded to each other. At this time, a gap between the completed first substrate 1 and the completed second substrate 11 is set based on a particle diameter of the spacer, but the range of approximately 4 to 15 micrometers is selected. Conditions of pressure application and heating are appropriately set in the range of 200 grams to 1 kg/cm$^2$ as a welding force, the range of 150 to 180° C. as a heating temperature, and the range of 30 to 90 minutes (main hardening step or main bonding step).

Then, a vacuum injection device is used to inject the polymer dispersed liquid crystal material 25 from the filling opening of the sealing member 26 (injecting step). After injection, the filling opening is sealed (sealing step). A pressure is applied between two smooth plates to uniform a gap amount, and a central part slightly bulges like a drum and the gap amount becomes uneven when the liquid crystal material is subjected to vacuum injection. When the gap amount is uneven, irregularities appear in an opaque state. The two smooth plates are used to apply a pressure to avoid occurrence of the opaque irregularities, thereby uniforming the gap amount.

Then, an ultraviolet ray is applied to polymerize the monomer (ultraviolet ray applying step). According to the first embodiment, since the pixel electrode 16 is formed of an ITO film, the ultraviolet ray is transmitted therethrough. The ultraviolet ray transmitting portions 19a formed of the first small holes are provided in the wiring electrode 19. Therefore, according to the first embodiment, as to ultraviolet ray irradiation, the ultraviolet ray is applied from a direction indicated by an arrow P, i.e., from the completed second substrate 11 side. Ultraviolet ray irradiation from the direction of P enables sufficiently photo-polymerizing the monomer in the display region and the peripheral region to achieve polymerization, thereby forming a polymer network. Ultraviolet ray irradiation can be appropriately set and performed within the ranges of 20 to 80 mW/cm$^2$ as an intensity, 30 to 120 seconds as a time, and 15 to 40° C. as a temperature while considering reliability and display characteristics.

According to the first embodiment, since the pixel electrode 16 is formed of a transparent ITO film, effecting ultraviolet ray irradiation from the completed second substrate side 11 alone can suffice. The pixel electrode 16 can be formed of a metal film, and ultraviolet ray irradiation is carried out from both the completed second substrate 11 side and the completed first substrate 1 side (outside of the completed first substrate 1) when the pixel electrode 16 is formed of a metal film. When the pixel electrode 16 is a metal film, a method of irradiating the monomer in the display region M with an ultraviolet ray from the completed first substrate 1 side to be polymerized, and irradiating the monomer in the peripheral region N with an ultraviolet ray from the completed second substrate 11 side to be polymerized is adopted.

In this way, to solve a problem, according to the present invention, a display apparatus that is formed by encapsulating a polymer dispersed liquid crystal material 25 between a pair of substrates (1 and 11) having opposed electrodes by a sealing member 26 and has a display region M in a region where the polymer dispersed liquid crystal material is encapsulated and a peripheral region N placed outside the display region is a display apparatus 30, wherein an electro conductive wiring electrode 19 having light shielding properties is provided in at least a part of the peripheral region N on one substrate (11) of the pair of substrates and the peripheral region N having the wiring electrode 19 provided therein has ultraviolet ray transmitting portions 19a that allows transmission of ultraviolet rays, the ultraviolet ray transmitting portions 19a being formed of multiple small holes (each of the small holes may have a circular shape, a square shape, a triangular shape, a polygonal shape, or a star shape), slits (they may have a rectangular shape or an elliptic shape), or notches (a side of the wiring electrode may be notched, or a center of a part close to the center of the wiring electrode 19 may be notched) partially provided in the wiring electrodes 19 (see FIG. 1).

The driving IC 27 is mounted at a position of the attachment portion 27a for the driving IC 27 on the completed second substrate 11 by using an anisotropic electroconductive adhesive, and a circuit substrate 28 that is used to connect a circuit, e.g., a control circuit provided outside the display apparatus is mounted at a position of the connection electrode pattern 21 on the completed second substrate 11 by using an anisotropic electroconductive adhesive. A protection film 29 is applied to an attached part of the driving IC 27, an attached part of the circuit substrate 28, or the exposed part of the electrode line pattern, thereby obtaining the display apparatus 30. The protection film 29 is provided for the purpose of avoiding the electrode line pattern from electrically corroding, and it is formed of a silicon resin or an epoxy resin.

The display apparatus 30 according to the first embodiment has a structure where the ultraviolet ray transmitting portions 19a formed of the first small holes are provided in the wiring electrode 19 and the monomer sandwiched between the light shielding member 9 arranged in the peripheral region N of the completed first substrate 1 and the wiring electrode 19 arranged in the peripheral region N of the completed second substrate 11 is polymerized by being irradiated with an ultraviolet ray from the ultraviolet ray transmitting portions 19a. When such a structure is adopted, the monomer in the polymer dispersed liquid crystal material 25 can be polymerized without producing an unpolymerized part.

According to this embodiment, although the TFT element 17 is used as a switching element, a structure using a switching element that is a nonlinear terminal with two terminals can be likewise applied. The configuration of the present invention can be applied to a display apparatus that uses a color filter.

Figure 8:
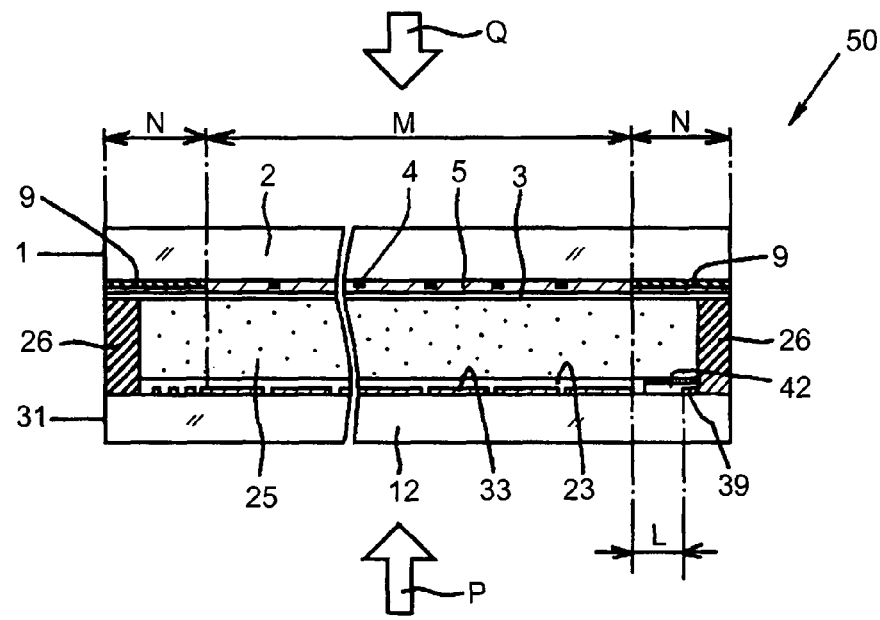
FIG. 8 is a cross-sectional view of a primary part in a display apparatus according to a second embodiment of the present invention.
Figure 9:
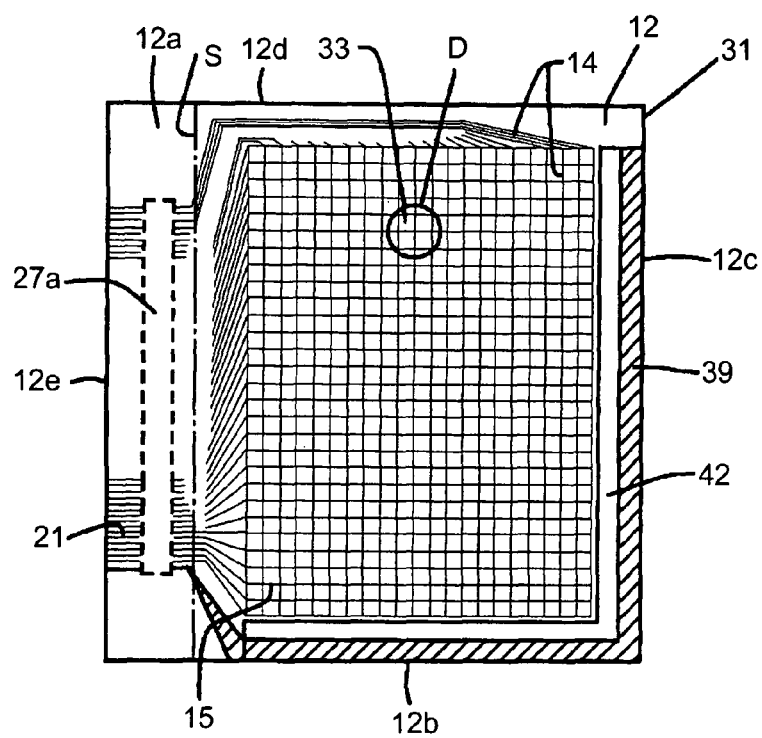
FIG. 9 is a plan view of a completed second substrate in FIG. 8.
Figure 10A:
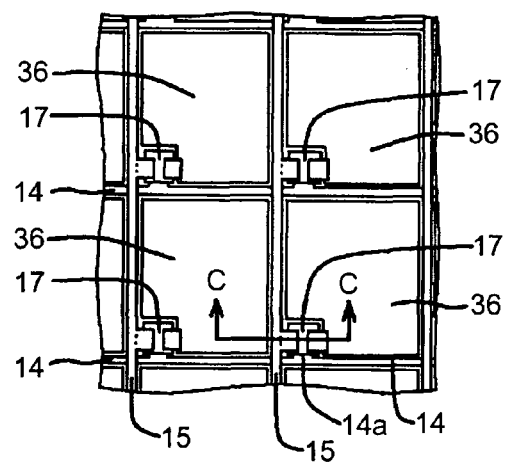
FIG. 10A is an enlarged plan view of an enlarged plan view of a part D in FIG. 9.
Figure 10B:
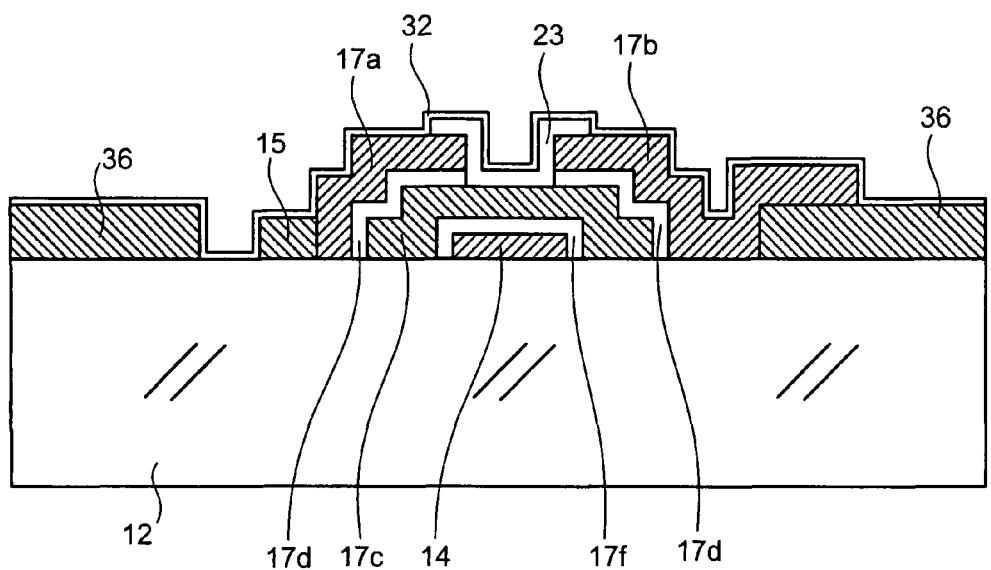
FIG. 10B is a cross-sectional view taken along a line C-C in FIG. 10A.

A display apparatus according to a second embodiment of the present invention will now be explained with reference to FIGS. 8 to 10. Here, FIG. 8 is a cross-sectional view of a primary part in a display apparatus 50 according to the second embodiment, FIG. 9 is a plan view of a completed second substrate depicted in FIG. 8, and FIGS. 10A and 10B are an enlarged plan view and a cross-sectional view of a part D depicted in FIG. 9 where FIG. 10A is an enlarged plan view and FIG. 10B is a cross-sectional view taken along a line C-C in FIG. 10A. Like reference numerals denote constituent components having the same specifications as those in the first embodiment, thereby explaining these components.

As shown in FIG. 8, the display apparatus 50 according to the second embodiment has a structure where a polymer dispersed liquid crystal material 25 in a PNLC mode is encapsulated in a gap between a completed first substrate 1 and a completed second substrate 31 arranged to face each other by using a sealing member 26. Although not depicted in FIG. 8, a transparent spacer, e.g., silica particles or plastic particles is dispersedly arranged to assure a necessary gap amount between the completed first substrate 1 and the completed second substrate 31. Here, as compared with the structure of the display apparatus according to the first embodiment, the completed second substrate 31 alone is different from the completed second substrate according to the first embodiment in structure. The completed second substrate 31 is different from the counterpart according to the first embodiment in specifications of each pixel electrode 36 and a wiring electrode 39 constituting the completed second substrate 31. The completed second substrate 31 having the different structure will be mainly explained hereinafter, and constituent components having the same structures will be explained to the necessary minimum extent.

As shown in FIG. 8, M denotes a display region that is a region where a display image can be seen, i.e., a region where the display image is displayed, and a region where each pixel electrode unit 33 is provided on the completed second substrate 31 is the display region M. In this display region M, a lattice-like black matrix 4 is provided on the completed first substrate 1, and each pixel electrode unit 33 is provided on the completed second substrate 31. N denotes a peripheral region, and a region that is provided outside the display region M and is adjacent to the display region M and is the peripheral region N. The completed first substrate 1 is provided on a display image visible side, and a light shielding member 9 having a corner bead function is arranged along the full circumference of the peripheral region N on this complete first substrate 1. Providing the light shielding member 9 eliminates unnecessary light leakage, and hence contours, etc. of a display image can be clearly visually recognized.

Here, as shown in FIG. 8, the completed first substrate 1 has the same structure as the completed first substrate according to the first embodiment. That is, the black matrix 4 is arranged in the display region M on a lower surface of the first substrate 2 formed of, e.g., transparent glass in a reticular pattern, and the light shielding member 9 is arranged in the peripheral region N. The flattening film 5 having both an insulating function and a flattening function is arranged on the black matrix 4 or the light shielding member 9, and a first transparent electrode 3 formed of an ITO film is arranged on the flatting film 5. The black matrix 4 arranged in the reticular pattern is provided at a position where it faces each of a gate electrode line and a signal electrode line, or the TFT element on the completed second substrate 31.

The completed second substrate 31 is configured by using a second substrate 12 formed of, e.g., transparent glass, and a substrate larger than the first substrate 1 is used as the second substrate 12 as depicted in FIG. 9. As shown in FIG. 9, the second substrate 12 has an extended portion 12 provided on a left part of an alternate long and short dash line S on the outer side 12e, and an attachment portion 27a (part indicated by a chain line in FIG. 9) to which a driving IC is attached is provided on this extended portion 12a. The second substrate 12 is larger than the first substrate 1 at this extended portion 12a alone. The completed second substrate 31 has a plurality of lattice-like pixel electrode units 33 arranged in the display region M on an upper surface of the second substrate 12. The part where the pixel electrode units 33 are provided is the display region M. A pull wiring pattern of the gate electrode lines 14 and the signal electrode lines 15 collecting at a position of the attachment portion 27a for the driving IC through the respective pixel electrode units 33 is arranged in the peripheral region N on an outer side 12d and the outer side 12e of the second substrate 12 neighboring the display region M. The wiring electrode 39 is arranged in the peripheral region on an outer side 12b and an outer side 12c. A connection electrode pattern 21 is arranged between the outer side 12e and the attachment portion 27a to achieve electrical conduction of the driving IC and a circuit substrate as an FPC. FIG. 9 is a view of a pull wiring pattern of gate electrode lines 14 and signal electrode lines 15. A part of the connection electrode pattern 21 is depicted, and the remainder is omitted. As shown in FIG. 9, a transparent electrode 42 that overlaps the wiring electrode 39 and is formed of an ITO film is arranged on the wiring electrode 39. As shown in FIG. 8, a protection insulating film 23 made of a transparent resin is arranged on each pixel electrode unit 33 in the display region M, the wiring pattern provided in the peripheral region N, and the transparent electrode 42.

The wiring electrode 39 according to the second embodiment is formed of an aluminum (Al) metal film, and arranged with a necessary gap L from the display region M as depicted in FIG. 8. This gap L forms an ultraviolet ray transmitting portion, and a monomer that is present in a region of the light shielding member 9 (e.g., the peripheral region N) is irradiated with an ultraviolet ray from this gap L. The transparent electrode 42 arranged on the wiring electrode 9 is provided to overlap the wiring electrode 39 and enter the region of the gap L. This wiring electrode 39 is connected with the first transparent electrode 3 of the completed first substrate 1 via electroconductive particles mixed in the sealing member 26, thereby achieving electrical conduction with respect to the first transparent electrode 3 from the wiring electrode 39. The wiring electrode 39 is provided to reduce a wiring resistance with respect to the first transparent electrode 3, and formed of an aluminum (Al) metal film. Since the transparent electrode 42 that is provided on the wiring electrode 39 and formed of an ITO film has the gap L, it suppresses an increase in a resistance of the wiring electrode 39 due to a reduction in an electrode width of the wiring electrode 39, and hence it is provided to lower the resistance.

The monomer that is present in the region of the light shielding member 9 is irradiated with an ultraviolet ray from the gap L and is polymerized. When the gap L is narrow, a region where the monomer is not sufficiently irradiated with the ultraviolet ray appears, and many unpolymerized parts are produced. The unpolymerized monomer rapidly exudes to the display region M, thus deteriorating a display quality. When the gap L is large, the monomer can be sufficiently irradiated with the ultraviolet ray to be polymerized, however, resistance of the wiring electrode 39 increases, and hence the voltage applied to the electrode must be increased. For this reason, the gap L must be set to an appropriate value while considering both a degree of occurrence of unpolymerization of the monomer and a resistance of the wiring electrode 39. For example, when the unpolymerized part is produced near the inner side of the sealing member 26 greatly apart from the display region, a considerably long period of time is taken until the unpolymerized polymer exudes to the display region. If this period falls within an allowable period range, the gap L can be sufficiently used. Setting an amount (width) of the gap L while considering, e.g., a period until the unpolymerized monomer exudes to the display region can suffice.

Each pixel electrode unit 33 is formed of a pixel electrode 36 using a TFT element 17. As shown in FIG. 10A, the pixel electrode unit 33 includes the gate electrode line 14 that is provided to control the TFT element 17, the signal electrode line 15 that is provided to apply an external signal to the TFT element 17, the TFT element 17 provided in a corner region where the gate electrode line 14 and the signal electrode line 15 cross each other, and the pixel electrode 36 that is provided to be connected with the TFT element 17 and formed of a metal film of, e.g., gold (Au). As shown in FIG. 10B, the TFT element 17 has a structure where the gate electrode 14a protruding sideways is provided at a part of the gate electrode line 14 formed of a tantalum (Ta) film, the insulating film 17f formed of a tantalum oxide (Ta2O5) as an anode oxide film of the gate electrode 14a is provided on the gate electrode 14a, and the semiconductor layer 17c formed of amorphous silicon (a-Si) is provided on and around the insulating film 17f. N-type amorphous silicon (N-type a-Si) 17d obtained by adding an impurity in amorphous silicon is provided on the semiconductor layer 17c to partially overlap the gate electrode 14a, and the source electrode 17a that is connected with the signal electrode line 15 and formed of molybdenum (Mo) and the drain electrode 17b that is connected with the pixel electrode 36 and formed of molybdenum (Mo) are provided on this N-type amorphous silicon 17d. This TFT 17 has the same configuration as that of the TFT according to the first embodiment. A protection insulating film 23 that avoids deterioration in characteristics of the semiconductor layer 17c is provided between the source electrode 17a and the drain electrode 17b on the semiconductor layer 17c. The processing layer 32 (e.g., an alignment film) that regularly aligns molecules of the liquid crystal is provided on and around the protection insulating film 23. The processing layer 32 may be the protection insulating film 23 and an alignment film provided on the protection insulating film 23 (see FIG. 10B).

The pixel electrode 36 according to the second embodiment is formed of a metal film of gold (Au). The gold metal film can be formed by, e.g., a vacuum deposition method, a sputtering method, or an ion plating method, and then this film can be finished into a necessary shape by, e.g., a photomask method or a photo-etching method. This pixel electrode 36 is formed of the gold metal film, and hence it has a glossy gold metal color tone.

As the polymer dispersed liquid crystal material 25 according to the second embodiment, a liquid crystal material in a PNLC mode that is the same as the liquid material used in the first embodiment is adopted. The polymer material, i.e., the monomer is polymerized by ultraviolet ray irradiation and then used. When the liquid crystal material in the PNLC mode is used, applying a voltage to a space between both the first transparent electrode 3 of the completed first substrate 1 and each pixel electrode 36 of the completed second substrate 31 allows the liquid crystal molecules in a part sandwiched between both the electrodes to become transparent, and the liquid crystal molecules are opaque when no voltage is applied. According to the second embodiment, since each pixel electrode 36 is formed of the gold metal film, a color tone of the gold metal film of the pixel electrode 36 is visually recognized when the liquid crystal molecules become transparent. A display image is displayed in a glossy gold metal color and an opaque color. Since the display image using both the opaque color and the glossy gold color has high contrast, thereby obtaining the clear and bright display image.

In the above configured display apparatus 50, as shown in FIG. 8, ultraviolet rays are separately or simultaneously applied from both a direction indicated by an arrow Q as the outside of the completed first substrate 1 and a direction indicated by an arrow P as the outside of the completed second substrate 31 to polymerize the monomer in the encapsulated polymer dispersed liquid crystal material. According to the second embodiment, the monomer that is present in the display region M is first irradiated with an ultraviolet ray from the direction of Q to be polymerized, and then the monomer that is present in the peripheral region N is irradiated with an ultraviolet ray from the direction of P to be polymerized. The ultraviolet ray irradiation is set within the intensity range of 20 to 80 mW/cm$^2$, the time range of 30 to 120 seconds, and the temperature range of 15 to 40° C. while considering reliability and display characteristics. Although manufacture can be performed by a single irradiation operation if a device that can perform ultraviolet ray irradiation from both the directions at a time is used, a device cost is increased. However, since the monomer can be polymerized by the irradiation device with a small output power when the irradiation operation is carried out on two stages in this manner, the device cost can be decreased, thereby reducing a manufacturing cost. Since an irradiation time is short, an increase in a manufacturing cost is small even if the irradiation operation is carried out on the two stages.

According to the display apparatus 50 of the second embodiment, since the necessary gap L is provided between the wiring electrode 39 provided in the peripheral region N of the completed second substrate 31 and the display region M having each pixel electrode unit 33 provided therein, the monomer can be irradiated with the ultraviolet ray from the completed second substrate 31 side through the gap L. The monomer can be polymerized to obtain a satisfactory image display quality.

Figure 11:
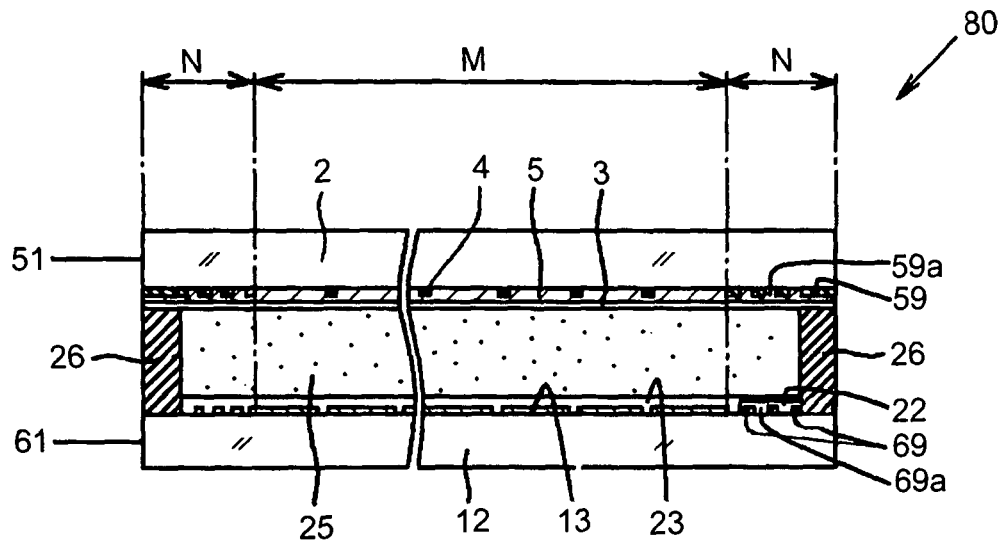
FIG. 11 is a cross-sectional view of a primary part in a display apparatus according to a third embodiment of the present invention.
Figure 12:
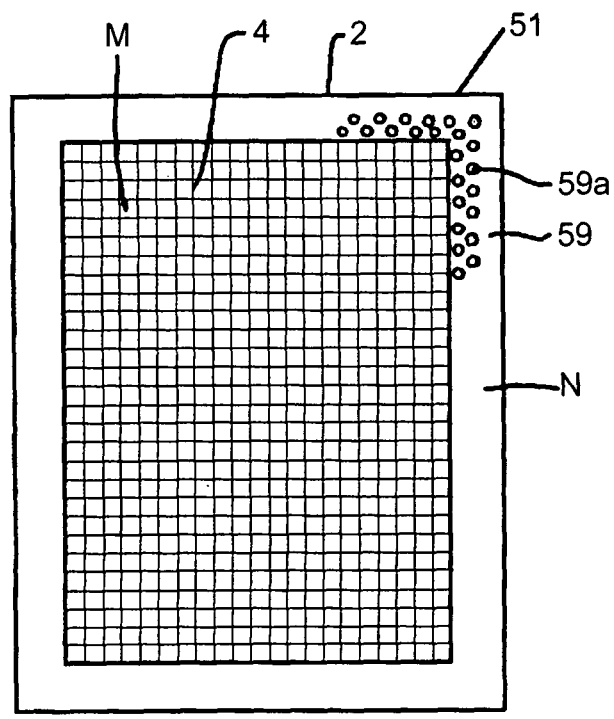
FIG. 12 is a plan view of a completed first substrate in FIG. 11.
Figure 13:
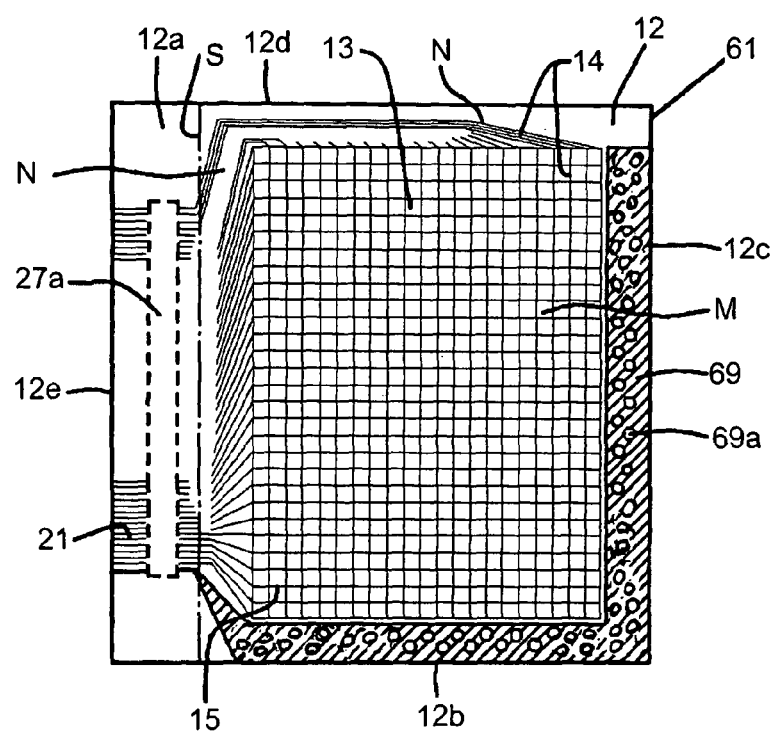
FIG. 13 is a plan view of a completed second substrate in FIG. 11.
Figure 14:
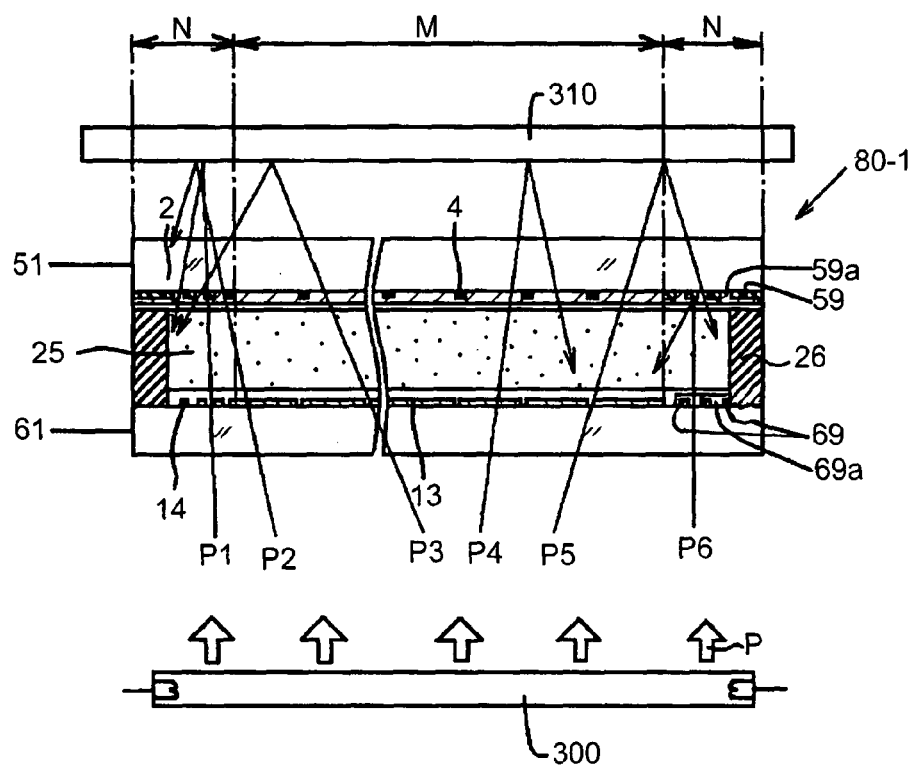
FIG. 14 is an explanatory drawing schematically showing an ultraviolet ray irradiation state of a display apparatus depicted in FIG. 11.

A display apparatus according to a third embodiment of the present invention will now be explained with reference to FIGS. 11 to 14. FIG. 11 is a cross-sectional view showing a primary part in the display apparatus according to the third embodiment of the present invention, FIG. 12 is a plan view of the completed first substrate depicted in FIG. 11, FIG. 13 is a plan view of the completed second substrate depicted in FIG. 11, and FIG. 14 is a schematic explanatory drawing of the ultraviolet ray irradiation state of the display apparatus depicted in FIG. 11. Like reference numerals denote constituent components having the same specifications as those of the constituent components in the display apparatus according to the first embodiment.

As shown in FIG. 11, a display apparatus 80 according to the third embodiment has a structure where a polymer dispersed liquid crystal material 25 in a PNLC mode is encapsulated in a gap between a completed first substrate 51 and a completed second substrate 61 arranged to face each other by using the sealing member 26. Although not depicted in FIG. 11, a transparent spacer, e.g., silica particles or plastic particles are dispersedly arranged to assure a necessary gap amount between the completed first substrate 51 and the completed second substrate 61. Here, comparing the structure of the display apparatus 80 according to the third embodiment with that of the display apparatus according to the first embodiment, since a shape of a light shielding member 59 arranged in a peripheral region N of the completed first substrate 51 has openings or holes, the third embodiment is different from the first embodiment, but both the structures may be equal to each other. A size or a positional relationship of each first small hole provided as an ultraviolet ray transmitting portion 69*a* in a wiring electrode 69 arranged in the peripheral region N of the completed second substrate 61 is different from that according to the first embodiment. The light shielding member 59 and the wiring electrode 69 having the different structures will be mainly explained hereinafter.

As shown in FIG. 11, M denotes a display region that is a region where a display image is displayed. N denotes a peripheral region, and a region that is present outside the display region M and adjacent to the display region M is the peripheral region N. The completed first substrate 51 is placed on a display image visible side, and the light shielding member 59 having a corner bead function is arranged along a full circumference of the peripheral region N of the completed first substrate 51.

Here, as shown in FIGS. 11 and 12, the completed first substrate 51 has a structure where a black matrix 4 is arranged in the display region M on a lower surface side of the first substrate 2 formed of, e.g., transparent glass in a reticular pattern, and the light shielding member 59 is arranged in the peripheral region N. A transparent flattening film 5 with an insulating function and a flattening function is arranged on the black matrix 4 or the light shielding member 59, and a first transparent electrode 3 formed of an ITO film is arranged on the flattening film 5.

Transmitting units that are formed of the second small holes 59*a* and allow transmission of ultraviolet rays are provided in the light shielding member 59. Each of these second small holes 59*a* is formed with a size of 20 to 30 micrometers, and these holes are provided along the full circumference of the peripheral region N according to the third embodiment. As shown in FIG. 12, the second small holes 59*a* are drawn in a part of the peripheral region N alone, and the remaining small holes are omitted. The second small holes 59*a* dispersedly provided at uniform intervals. The size 20 to 30 micrometers of the second small holes is not visually recognized, and the fact that a limit of the size that is visible to the human eye is approximately 30 micrometers and even a size of approximately 60 to 70 micrometers is not visible if intensive reflective light is present therearound has been confirmed from results of various kinds of experiments. In regard to a total area of the second small holes 59*a* dispersed at uniform intervals, according to the third embodiment, a numerical aperture (the numerical aperture explained herein means a ratio of a total area of the small holes with respect to an area of the region where the small holes are formed) is set to fall within the range of 30 to 40%. The fact that sufficient polymerization can be carried out if the numerical aperture of the small holes is 30% has been confirmed from results of various kinds of experiments. Even if the size of each small hole is small, it can be visually recognized when the small holes are provided as a block. Setting the size of each small hole to 30 micrometers or below, dispersing the small holes at uniform intervals, and setting the numeral aperture to be less than 50% (when the numerical aperture is higher than 50%, the light shielding member is hard to see all the more) can suffice. Although the second small hole 59*a* is formed into a circular shape according to the third embodiment, the shape is not restricted to the circular shape, and an elliptic shape, an oval shape, a square shape, or a polygonal shape can be selected with no problem.

According to the third embodiment, the light shielding member 59 is formed of a two-layered metal film including a chrome oxide (CrO) metal film and a chrome (Cr) metal film like the black matrix 4. Since the light shielding member 59 having the second small holes 59*a* provided therein is formed of the same material as that of the black matrix 4, the light shielding member 59 having the small holes 59*a* provided therein and the black matrix 4 are simultaneously formed. A method of forming the light shielding member 59 having the second small holes 59*a* provided therein and the black matrix 4 is as follows. First, a chrome oxide (CrO) metal is first formed with a necessary thickness on an entire surface of the completed first substrate 51 on the second substrate 2 side by, e.g., a vacuum deposition method, a sputtering method, or an ion-plating method. Then, a chrome (Cr) metal film is formed on the chrome oxide (CrO) metal film by the same method. For example, when the vacuum deposition method is adopted, a pressure in a chamber of a vacuum deposition machine at the time of deposition is set to $1\times10^{-6}$ to $5\times10^{-5}$ torr ($1.33\times10^{-4}$ to $6.65\times10^{-3}$ Pa) to carry out vacuum deposition. Since a thickness is determined based on a deposition time, deposition is performed until a necessary thickness is obtained. As a result, the two-layered metal film including the chrome oxide (CrO) metal film and the chrome (Cr) metal film can be obtained. Then, a resist film is formed on the two-layered metal film including the chrome oxide (CrO) metal film and the chrome (Cr) metal film by a method, e.g., screen printing. Subsequently, exposure processing using ultraviolet rays is carried out. In the exposure processing, a positive photographic film having shapes of the light shielding member 59 having the second small holes 59*a* provided therein and the black matrix 4 are drawn thereon is mounted on the resist film, and an ultraviolet ray is applied from above to carry out exposure. The resist film on the light shielding member 59 and the black matrix 4 is hardened by exposure, a part excluding the light shielding member 59 and the black matrix 4, i.e., portions of the second small holes 59*a* and the lattice of the black matrix 4 are not irradiated with an ultraviolet ray, and hence they remain soft without being hardened. Then, the soft resist film that is present at the positions of the ultraviolet ray transmitting portions 19*a* is dissolved by a dissolving liquid to be removed. As a result, the two-layered metal film present at the positions of the second small holes 59*a* and the lattice is exposed. On the other hand, the hardened resist film on the light shielding member 59 and the black matrix 4 remains as it is. Subsequently, the exposed two-layered metal film is etched by an etchant to be removed. As a result, the second small holes 59*a* and the lattice are formed. Then, the hardened resist film on the light shielding member 59 and the hardened resist film on the black matrix 4 are separated by a separation liquid. As a result, the light shielding member 59 having the second small holes 59*a* provided therein and the black matrix 4 are brought to completion. When this method is utilized, even a small hole having a size of approximately 5 micrometers can be formed.

As shown in FIG. 13, the completed second substrate 61 is constituted of the second substrate 12 formed of, e.g., transparent glass, an extended portion 12*a* (left part of an alternate long and short dash line S) is provided on the outer side 12*e* of the second substrate 12, and the completed first substrate 51 is larger than the second substrate 12 at this extended portion 12*a* alone. The attachment portion 27*a* (part indicated by a chain line in FIG. 13) for attachment of a driving IC is provided on this extended portion 12*a*. The completed second substrate 61 has a plurality of lattice-like pixel electrode units 13 arranged in the display region M on an upper surface of the second substrate 12. The part where the pixel electrode units 13 are provided is the display region M. A pull wiring pattern of the gate electrode lines 14 and the signal electrode lines 15 collecting at a position of the attachment portion 27a for the driving IC through the respective pixel electrode units 13 is arranged in the peripheral region N on an outer side 12d and the outer side 12e of the second substrate 12 neighboring the display region M. The wiring electrode 69 is arranged in the peripheral region on an outer side 12b and an outer side 12c. A wiring electrode 69 of this completed second substrate 61 is connected with the first transparent electrode 3 of the completed first substrate 51 through electroconductive particles mixed in the sealing member 26 to achieve electrical conduction. In this manner, according to this embodiment, a transfer wiring structure is formed. The connection electrode pattern 21 is arranged between the outer side 12e and the attachment portion 27a to achieve electrical conduction between the driving IC and a circuit substrate as an FPC. In the wiring electrode 69, ultraviolet ray transmitting portions 69a formed of the first small holes are dispersedly provided at uniform intervals, and the transparent electrode 22 formed of an ITO film is arranged on the wiring electrode 69 having the ultraviolet ray transmitting portions 69a as shown in FIG. 11. The ultraviolet ray transmitting portions 69a formed of the first small holes do not overlap the second small holes 59a provided in the light shielding member 59 of the completed first substrate 51. That is, the first small holes 69a are provided at positions deviating from those of the second small holes 59a. The thus configured completed second substrate 61 is different from the completed second substrate according to the first embodiment in a size of the first small hole or a relationship of the small hole as the ultraviolet ray transmitting portion 69a in the wiring electrode 69. Although, the size of the first small hole in the wiring electrode according to the first embodiment is not restricted in particular, the size of the first small hole in the wiring electrode 69 according to the third embodiment is restricted, and the first small hole is formed to have a size that is the same as that of the second small hole 59a provided in the light shielding member 59 of the completed first substrate 51, i.e., the size of 20 to 30 micrometers. Each first small hole 69a is provided at a position that does not overlap that of the second small hole 59a. As shown in FIG. 11, a protection insulating film 23 formed of a transparent resin is arranged on each pixel electrode unit 13 in the display region M, the wiring pattern provided in the peripheral region N, or the transparent electrode 22.

The wiring electrode 69 according to the third embodiment is formed of an aluminum (Al) metal film. This wiring electrode 69 is provided to reduce an electrical resistance of an electrical wiring line for the first transparent electrode 3, and electrical conduction of the first transparent electrode 3 of the completed first substrate 51 is achieved from this wiring line electrode 69 on the completed second substrate 61 through electroconductive particles mixed in the sealing member 26. Since the wiring electrode 69 has light shielding properties, the ultraviolet ray transmitting portions 69a formed of the first small holes are provided to allow transmission of ultraviolet rays. The ultraviolet ray transmitting portions 69a are provided to apply the ultraviolet ray from the completed second substrate 61 side having the wiring electrode 69 provided thereon, thereby polymerizing the monomer that is present in the peripheral region. The ultraviolet ray transmitting portion 69a is formed with the same size, the same shape, and the same numerical aperture as those of the second small hole 59a provided in the light shielding member 59 on the completed first substrate 51, and it is set to a size that cannot be visually recognized by the human eye. On the other hand, the ultraviolet ray transmitting portion 69a may not be formed with the same size, the same shape, and the same numerical apertures as those of the second small hole 59a provided in the light shielding member 59 on the completed first substrate 51, but the size t cannot be visually recognized by the human eye is preferable. Alternatively, appropriately setting a size relationship between the ultraviolet ray transmitting portion 69a and the second small hole 59a provided in the light shielding member 59 on the completed first substrate 51 in such a manner that transmitted light from the lower side of the display apparatus 80 cannot be seen as light that leaks to the upper visible side is preferable. The ultraviolet ray transmitting portions 69a are dispersedly provided at uniform intervals, and they are provided at positions deviating from those of the second small holes 59a in such a manner that they do not overlap the second small holes 59a provided in the light shielding member 59 on the completed first substrate 51. Therefore, the light shielding member 59 is present at the position of the completed first substrate 51 facing the ultraviolet ray transmitting portions 69a.

The wiring electrode 69 having the ultraviolet ray transmitting portions 69a provided therein is manufactured by the same method as the manufacturing method explained in conjunction with the first embodiment. That is, an aluminum metal film is formed on the second substrate 12 of the completed second substrate 61 by, e.g., a vacuum deposition method, a sputtering method, or an ion plating method using an aluminum metal. For example, when forming by the vacuum deposition method, a pressure in a chamber of a vacuum deposition machine at the time of deposition is set to $1 \times 10^{-6}$ to $5 \times 10^{-5}$ torr ($1.33 \times 10^{-4}$ to $6.65 \times 10^{-3}$ Pa) to effect vacuum deposition. Since a thickness is determined based on a deposition time, performing deposition until a necessary thickness is obtained can suffice. Then, a resist film is formed on the aluminum metal film by a method, e.g., screen printing. Subsequently, exposure processing using ultraviolet rays is carried out. In the exposure processing, a positive photographic film having a shape of the wiring electrode 69 with the ultraviolet ray transmitting portions 69a drawn thereon is mounted on the resist film, and the ultraviolet ray is applied from above to execute exposure. Based on exposure, the resist film that is present at the shape part of the wiring electrode 69 is hardened, and the resist film that is present at the positions of the ultraviolet ray transmitting portions 69a remains soft without being hardened since it is not irradiated with the ultraviolet ray. Then, the soft resist film that is present at the positions of the ultraviolet ray transmitting portions 69a is dissolved by a dissolving liquid and removed. As a result, the aluminum metal film that is present at the positions of the ultraviolet ray transmitting portions 69a is exposed. The other hardened resist film that is present at the position where the wiring electrode 69 is formed remains as it is. Subsequently, the exposed aluminum metal film that is present at the positions of the ultraviolet ray transmitting portions 69a is etched by an etchant and removed. Consequently, the ultraviolet ray transmitting portions 69a are formed. Then, the hardened resist film that is present at the position where the wiring electrode 69 is formed is separated by a separation liquid. As a result, the wiring electrode 69 having the ultraviolet ray transmitting portions 69a provided therein is brought to completion. When each ultraviolet ray transmitting portion is formed by this method, a very small hole that is approximately 5 micrometers can be formed. According to the third embodiment, each ultraviolet ray transmitting portion 69 is formed with a size of 20 to 30 micrometers.

Each pixel electrode unit 13 arranged on the completed second substrate 61 is a pixel electrode unit that uses a TFT element, and the pixel electrode includes a transparent electrode formed of an ITO film. Since the structure of this pixel electrode unit 13 is the same as that of the pixel electrode portion according to the first embodiment, its explanation is omitted.

As the polymer dispersed liquid crystal material 25 according to the third embodiment, a liquid crystal material in a PNLC mode that is the same as the liquid crystal material utilized in the first embodiment is used. The polymer material, i.e., the monomer is irradiated with an ultraviolet ray to be polymerized and used. When the liquid crystal material in the PNLC mode is used, applying a voltage to both the first transparent electrode 3 on the completed first substrate 1 and the pixel electrode 36 on the completed second substrate 31 changes liquid crystal molecules in a part sandwiched between both the electrodes to become transparent, and applying no voltage allows the liquid crystal molecules to stay in an opaque state. Therefore, a display image is formed by utilizing the opaque state and the transparent state.

The sealing member 26 is constituted of a member obtained by mixing electroconductive particles in a thermosetting resin, e.g., an epoxy resin. The sealing member having the same specification as that in the first embodiment is used. Each electroconductive particle has the same size as that of a spacer (not depicted) arranged in the gap between the completed first substrate 51 and the completed second substrate 61, and such electroconductive particles are used. As the electroconductive particle, a particle obtained by providing an electroconductive metal coating on a surface of, e.g., a silica particle or a plastic particle is used. When the electroconductive particles are combined with an insulating resin of the sealing member 26, bonding the completed first substrate 51 to the completed second substrate 61 enables achieving an electrical conduction between the first transparent electrode 3 on the completed first substrate 51 and the wiring electrode 69 on the completed second substrate 61.

The above configured display apparatus 80 is manufactured as follows. The sealing member 26 is applied with a predetermined pattern (e.g., a frame-like pattern) to one of the completed first substrate 51 and the completed second substrate 61 (it may be applied to both the substrates) by a method, e.g., screen printing. At this time, an opening serving as an inlet for the polymer dispersed liquid crystal material 25 is provided at one position. Then, the sealing member is half-hardened at a temperature of approximately 80° C., and the spacer is dispersed on the substrate in the half-hardened state by using a dispersion device. As the dispersion method, either a wet dispersion method or a dry dispersion method may be adopted. Then, the completed first substrate 51 and the completed second substrate 61 are arranged to face each other, this structure is heated in a baking furnace under pressure from a pressure device, e.g., an air bag to harden the sealing member 26, and the completed first substrate 51 and the completed second substrate 61 are bonded to each other. At this time, although the gap between the completed first substrate 51 and the completed second substrate 61 is determined based on a particle diameter of the spacer, the range of approximately 4 to 15 micrometers is selected. The pressurization and heating conditions are appropriately set within the pressure range of 200 grams to 1 kg/cm$^2$, the heating temperature range of 150 to 180° C., and the time range of 30 to 90 minutes, and then carried out (present bonding step).

Then, the polymer dispersed liquid crystal material 25 is injected from the inlet of the sealing member 26 by using a vacuum injection device (injecting step). After injection, the display apparatus is sandwiched between two smooth plates, an ultraviolet curing resin is applied to the inlet under pressure, and an ultraviolet ray is applied to seal the inlet (sealing step). The pressure is applied with the display apparatus being sandwiched between the two smooth plates to uniform a gap amount, the central part slightly bulges like a drum when the liquid crystal material is injected in a vacuum, and the gap amount thereby becomes uneven. When the gap amount is uneven, the opaque state has unevenness. The two smooth plates apply a pressure to avoid occurrence of unevenness in the opaque state, thus uniforming the gap amount. As a result, a display apparatus 80-1 that has the polymer dispersed liquid crystal material 25 encapsulated therein can be obtained. In the state of this display apparatus 80-1, the polymer dispersed liquid crystal material 25 is in the monomer state.

Then, an ultraviolet ray is applied to polymerize the monomer (ultraviolet ray applying step). The ultraviolet ray applying method is carried out by using a method depicted in FIG. 14. As shown in FIG. 14, the display apparatus 80-1 that has the polymer dispersed liquid crystal material 25 encapsulated therein is arranged between an ultraviolet ray irradiation device 300 having, e.g., a mercury lamp provided therein and a reflection plate 310. The display apparatus 80-1 is arranged in a state where the completed second substrate 61 side faces the ultraviolet ray irradiation device 300. Then, the ultraviolet ray irradiation device 300 emits ultraviolet rays from a direction indicated by each arrow P. Reference characters P1 to P6 denote traveling paths of ultraviolet lights. As shown in FIG. 14, the ultraviolet light is transmitted through the gap in the pull pattern of the gate electrode lines 14 present in the peripheral region N of the completed second substrate 61 to enter the polymer dispersed liquid crystal material 25. The ultraviolet light (P1) is transmitted through each second small hole 59a in the light shielding member 59 present in the peripheral region N of the completed first substrate 51, reflected by the reflection plate 310, again transmitted through each second small hole 59a in the light shielding member 59 on the completed first substrate 51, and enters the polymer dispersed liquid crystal material 25. The ultraviolet light (P3 or P5) is transmitted through each pixel electrode unit 13 in the display region M on the completed second substrate 61 to enter the polymer dispersed liquid crystal material 25, again transmitted through the display region M on the completed first substrate 51, reflected by the reflection plate 310, again transmitted through each second small hole 59a in the light shielding member 59 in the peripheral region N on the completed first substrate 51, and enters the polymer dispersed liquid crystal material 25. The ultraviolet light (P4) is transmitted through each pixel electrode unit 13 in the display region M on the completed second substrate 61 to enter the polymer dispersed liquid crystal material 25, again transmitted through the display region M on the completed first substrate 51, reflected by the reflection plate 310, again transmitted through the display region M on the completed first substrate 51, and enters the polymer dispersed liquid crystal material 25. The ultraviolet light (P6) is transmitted through each ultraviolet ray transmitting portion 69a in the wiring electrode 69 present in the peripheral region N on the completed second substrate 61 to enter the polymer dispersed liquid crystal material 25, and reflected by the light shielding member 59 on the completed first substrate 51. The ultraviolet lights demonstrating such traveling paths appear.

When each second small hole 59a as the light transmitting unit is provided in the light shielding member 59 on the completed first substrate 51, reflected light from the reflection plate is transmitted through each second small hole 59a to be applied to the monomer in the peripheral region N. Since not only the ultraviolet light that enters from each ultraviolet ray transmitting portion 69a provided in the wiring electrode 69 but also the reflected light ray from the reflection plate 310 enter, the monomer in the peripheral region N is polymerized without unpolymerization, thereby forming a polymer network. Although the monomer that is present on the TFT element of each pixel electrode unit 13 is not irradiated with the direct ultraviolet light emitted from the ultraviolet ray irradiation device 300, it is irradiated with the reflected light from the reflection plate 310, and hence the monomer is assuredly polymerized in a uniform state.

As the display apparatus that has the monomer polymerized based on ultraviolet ray irradiation by the above method, the driving IC or the circuit substrate is arranged on the completed second substrate 61 to obtain the display apparatus 80 by the same method as the manufacturing method explained in conjunction with the first embodiment.

Although ultraviolet ray irradiation according to the third embodiment is carried out from the completed second substrate 61 side, the reflection plate 310 may be placed on the completed second substrate 61 side and the ultraviolet ray irradiation device 300 may be arranged on the first substrate 51 side, thereby applying ultraviolet rays from the completed first substrate 51 side. When the transmitting unit as each second small hole 59a is arranged in the light shielding member 59 and the ultraviolet ray transmitting portion 69a as each first small hole is provided in the wiring electrode 69 in this manner, the monomer can be effectively polymerized by the ultraviolet ray irradiation method utilizing the reflection plate.

When the second small hole 59a provided in the light shielding member 59 is reduced in size so that it cannot be visually recognized, discomfort about an appearance does not arise at all.

Although each second small hole is used as the ultraviolet ray transmitting unit provided in the light shielding member 59 according to the third embodiment, the transmitting unit is not restricted to the small hole, and a light wavelength selection transmitting member that allows transmission of a wavelength of ultraviolet light can be used. As this type of member, there is a dielectric multilayer film. This dielectric multilayer film is formed by alternately laminating a low-refraction dielectric layer of, e.g., a silicon dioxide (SiO2: a refractive index n1=1.45) or a magnesium fluoride (MgF2: a refractive index n1=1.37) and a high-refractive dielectric layer of a titanium dioxide (TiO2: a refractive index n1=2.52), a hafnium oxide (HfO2: a refractive index=2.00), or a zirconium oxide (ZrO: a refractive index n1=2.4) in the range of 20 to 40 layers.

When this dielectric multilayer film is used as the light shielding member, the ultraviolet ray can be transmitted to polymerize the monomer in the peripheral region N.

Figure 15:
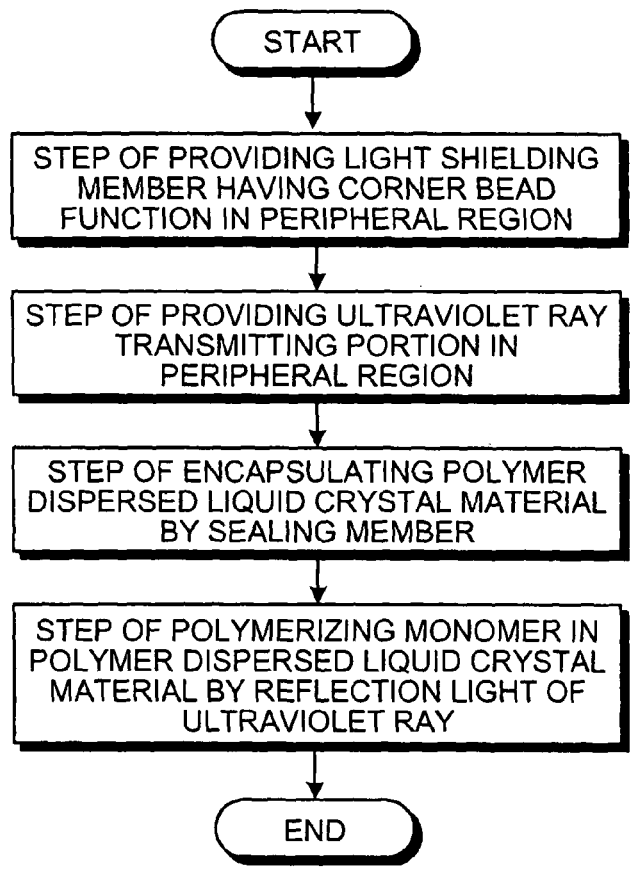
FIG. 15 is an explanatory drawing of a part of a process for explaining a manufacturing method of a display apparatus according to the third embodiment of the present invention.

The accordingly obtained manufacturing method of a display apparatus according to the present invention is explained with reference to FIG. 15, wherein a manufacturing method of a display apparatus 80 that is formed by encapsulating a polymer dispersed liquid crystal material 25 between a pair of substrates (51 and 61) having opposed electrodes by a sealing member 26 and has a display region M in a region where the polymer dispersed liquid crystal material 25 is encapsulated and a peripheral region N positioned outside the display region, the manufacturing method having: a step of providing a light shielding member 59 having a transmitting unit (59a) that allows transmission of ultraviolet rays in the peripheral region N on one substrate (51) of the pair of substrates (51 and 61) to provide a corner bead function; a step of providing an electro conductive wiring electrode 69 having light shielding properties in at least a part of the peripheral region N of the other substrate 61 facing the substrate having the light shielding member 59 provided thereon, and providing ultraviolet ray transmitting portions 69a that allow transmission of ultraviolet rays in the peripheral region N having the wiring electrode 69 provided thereon; a step of encapsulating the polymer dispersed liquid crystal material 25 between the substrate 51 having the light shielding member 59 provided thereon and the substrate 61 having the wiring electrode provided thereon by a sealing member 26; and a step of arranging a member (uncompleted display apparatus that is yet to be completed (e.g., 80-1)) having the polymer dispersed liquid crystal material 25 encapsulated in a gap between the substrates (51, 61) by the sealing member 26 between an ultraviolet ray irradiation device 300 and a reflection plate 310, and applying an ultraviolet ray from the ultraviolet ray irradiation device 300 toward the member (80-1) to polymerize a monomer in the polymer dispersed liquid crystal material 25 by direct incident light of the ultraviolet light that strikes on the monomer from the ultraviolet ray irradiation device 300 and reflected light of the ultraviolet ray reflected from the reflection plate 310. At this time, the ultraviolet ray transmitting portions 69a are formed of a plurality of holes that are partially provided in the wiring electrode 69. The ultraviolet ray transmitting portions 69a can be obtained by forming openings 69a or holes 69a that are small holes (they may have a circular shape, a square shape, a triangular shape, a polygonal shape, or a start shape), slits (they may have a rectangular shape or an elliptic shape), or notches (a side of the wiring electrode 69 may be notched, or the side of the wiring electrode 69 may be partially notched, or a center or a part close to the center of the wiring electrode 69 may be partially notched) partially provided in the wiring electrodes 69. A light shielding member 59 that has transmitting units (59a) that allow transmission of an ultraviolet ray to form a corner bead function is provided in the peripheral region N on the substrate 51. The transmitting units 59a are obtained by forming openings 59a, holes 59a, or notches 59a that are small holes (they may have a circular shape, a square shape, a triangular shape, a polygonal shape, or a star shape), slits (they may have a rectangular shape or an elliptic shape), or notches (a side of the light shielding member 59 may be notched, or the side of the light shielding member 59 may be partially notched, or a center or a part close to the center of the light shielding member 59 may be partially notched) partially provided in the light shielding member 59. However, when the openings are provided in the light shielding member 59, a size of each opening and a density and a density state of the openings must be appropriately set to avoid unnecessary light leakage. At this time, when a light shielding wiring electrode 69 or any other light shielding member is appropriately arranged on a completed second substrate 61, the light shielding wiring electrode 69 and any other light shielding member may be used as units that assist a light shielding function of the light shielding member 59 on a completed first substrate 51 (see FIG. 11) (see FIG. 14).

Figure 16:
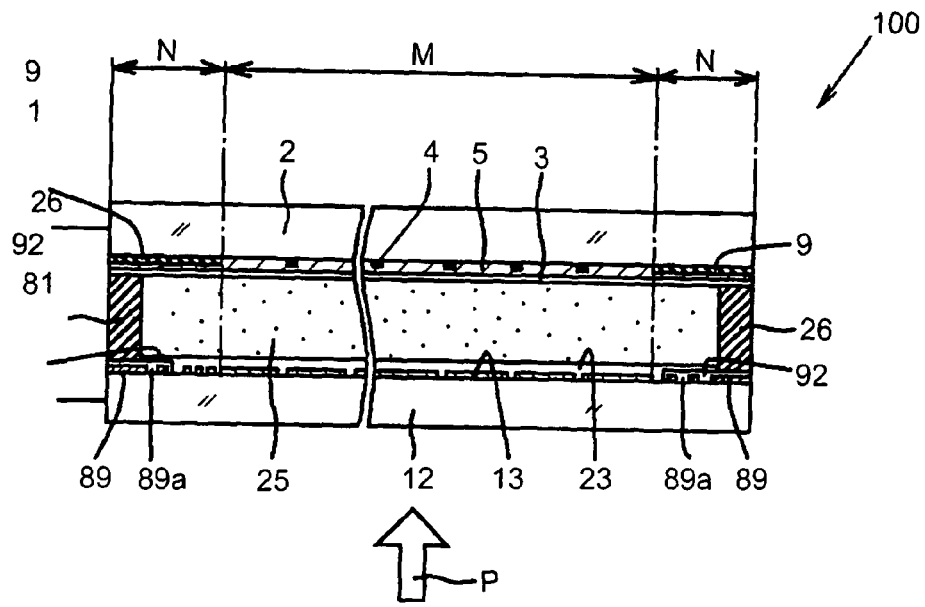
FIG. 16 is a cross-sectional view of a primary part in a display apparatus according to a fourth embodiment of the present invention.
Figure 17:
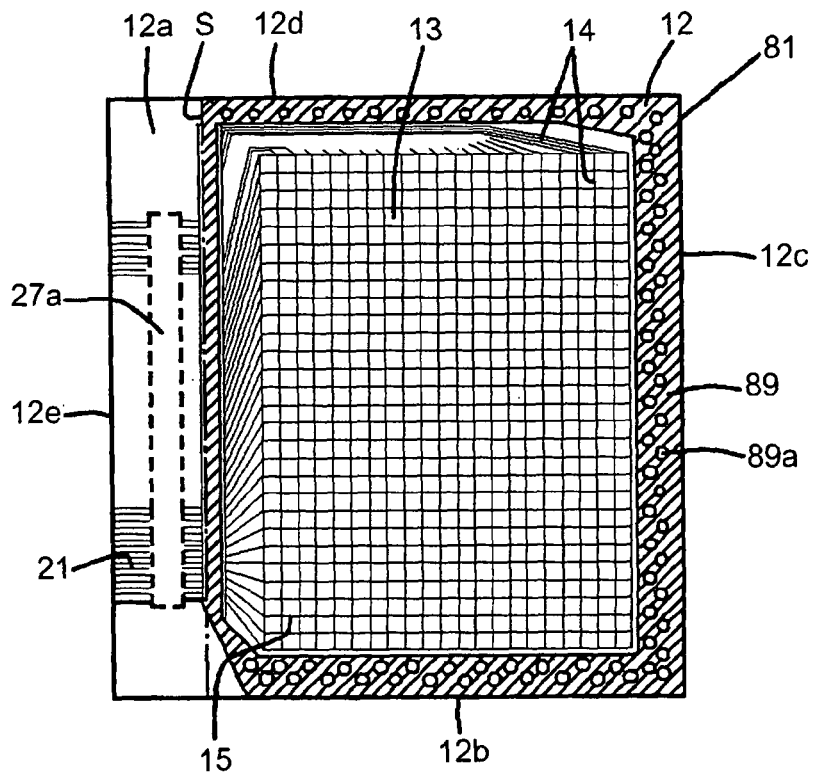
FIG. 17 is a plan view of a completed second substrate in FIG. 16.

A display apparatus according to a fourth embodiment of the present invention will now be explained with reference to FIGS. 16 and 17. Here, FIG. 16 is a cross-sectional view of a primary part in the display apparatus according to the fourth embodiment of the present invention, and FIG. 17 is a plan view of a completed second substrate depicted in FIG. 16. Like reference numerals denote constituent components having the same specifications as those of the constituent components in the display apparatus according to the first embodiment for an explanation.

As shown in FIG. 16, a display apparatus 100 according to the fourth embodiment has a structure where the polymer dispersed liquid crystal material 25 in a PNLC mode is encapsulated in a gap between the completed first substrate 1 and a completed second substrate 81 arranged to face each other by using the sealing member 26. Although not depicted in FIG. 16, a transparent spacer, e.g., silica particles or plastic particles is dispersedly arranged to assure a necessary gap amount between the completed first substrate 1 and the completed second substrate 81. The completed first substrate 1 in this example has the same structure as that of the completed first substrate according to the first embodiment. The completed second substrate 81 is different from that according to the first embodiment in shapes of a wiring electrode 89 arranged in a reticular pattern in a peripheral region and of a transparent electrode 92 arranged on the wiring electrode 89.

As shown in FIG. 16, M denotes a display region, and it is a region where a display image is displayed. N denotes a peripheral region, and a region that is present outside the display region M and adjacent to the display region M is the peripheral region N. The completed first substrate 1 is present on a display image visible side, and the light shielding member 9 having a corner bead function is arranged along the full circumference of the peripheral region N of this completed first substrate 1.

The completed first substrate 1 has the same structure as that of the completed first structure according to the first embodiment. That is, as shown in FIG. 16, the black matrix 4 is arranged in the display region M on a lower surface of a first substrate 2 formed of, e.g., transparent glass in a reticular pattern, and the light shielding member 9 is arranged in the peripheral region N. The transparent flattening film 5 having an insulating function and a flattening function is arranged on this black matrix 4 or the light shielding member 9, and the first transparent electrode 3 formed of an ITO film is arranged on this flattening film 5.

As shown in FIG. 17, the completed second substrate 81 is constituted of the second substrate 12 formed of, e.g., transparent glass, the extended portion 12a (left part of an alternate long and short dash line S) is provided on the outer side 12e of the second substrate 12, and the second substrate 12 is larger than the first substrate 2 of the completed first substrate 1 at this extended portion 12a alone. The attachment portion 27a (part indicated by a chain line in FIG. 17) for attachment of the driving IC is provided on this extended portion 12a. The completed second substrate 81 has a plurality of lattice-like pixel electrode units 13 arranged in the display region M on an upper surface of the second substrate 12. The part where the pixel electrode units 13 are provided is the display region M. A pull wiring pattern of the gate electrode lines 14 and the signal electrode lines 15 collecting at a position of the attachment portion 27a for the driving IC through the respective pixel electrode units 13 is arranged in the peripheral region N on an outer side 12d and the outer side 12e of the second substrate 12 neighboring the display region M. The wiring electrode 89 is arranged outside a wiring pattern of gate electrode lines 14 in the peripheral region N on the outer side 12d of the completed second substrate 81. The wiring electrode 89 is also arranged in the peripheral region N on the outer side 12e. Since the wiring pattern of the gate electrode lines 14 and signal electrode lines 15 is arranged toward the attachment portion 27a for the driving IC in the peripheral region N on the outer side 12e, an insulating film (not depicted) is arranged between the wiring pattern and the wiring electrode 89 to avoid contact due to overlapping intersection of the wiring pattern and the wiring electrode 89. The wiring electrode 89 is arranged in the peripheral region on an outer side 12b and an outer side 12c of the second substrate 12. The wiring electrode 89 according to the fourth embodiment is an electrode arranged along the full circumference of the peripheral region N. This wiring electrode 89 is connected with the first transparent electrode 3 of the completed first substrate 1 through electroconductive particles mixed in the sealing member 26 to achieve electrical conduction, and a voltage is supplied to the first transparent electrode 3. A connection electrode pattern 21 is arranged between the outer side 12e and the attachment portion 27a to achieve electrical conduction between the driving IC and a circuit substrate as an FPC. Ultraviolet ray transmitting portions 89a formed of the first small holes are dispersedly arranged in the wiring electrode 89 on the outer side 12b, the outer side 12c, and the outer side 12d. As shown in FIG. 16, a transparent electrode 92 formed of an ITO film is arranged on the wiring electrode 89 having the ultraviolet ray transmitting portions 89a provided therein. A protection insulating film 23 formed of a transparent resin is arranged on each pixel electrode unit 13 in the display region M, the wiring pattern provided in the peripheral region N, and the transparent electrode 92 of the completed second substrate 81.

The wiring electrode 89 on the completed second substrate 81 according to the fourth embodiment is formed by using an aluminum (Al) metal film. This wiring electrode 89 is provided to reduce an electrical resistance that achieves electrical conduction with respect to the first transparent electrode 3 on the completed first substrate 1, and it is connected with the first transparent electrode 3 on the completed first substrate 1 through electroconductive particles mixed in the sealing member 26, thereby attaining electrical conduction with respect to the wiring electrode 89. Since this wiring electrode 89 has light shielding properties, the ultraviolet ray transmitting portions 89a formed of the first small holes that allow transmission of ultraviolet rays is provided in the wiring electrode 89. The ultraviolet ray transmitting portions 89a are provided to apply ultraviolet rays from the completed second substrate 81 side where the wiring electrode 89 is provided, thereby polymerizing the monomer that is present in the peripheral region. The ultraviolet ray transmitting portions 89a are provided in the wiring electrode 89 on the outer side 12b, the wiring electrode 89 on the outer side 12c, and the wiring electrode 89 on the outer side 12d, and they have the same size and are dispersedly provided at equal intervals. When the ultraviolet ray transmitting portions 89a have the same size and are dispersed at equal intervals, an ultraviolet ray irradiation light amount with respect to the monomer becomes uniform, and polymerization is uniformly carried out at the periphery. Although each ultraviolet ray transmitting portion 89a according to the fourth embodiment is formed into a circular shape, the shape is not restricted to the circular shape, and an elliptic shape, a square shape, a polygonal shape, and others can be selected. Since the wiring electrode 89 is arranged at a position where the wiring electrode 89 cannot be seen from the visible side, a size and a numerical aperture thereof (numerical aperture in this example means a ratio of a total area of the small holes with respect to an area of the region where the small holes are formed) increase an electrical resistance, and hence appropriately setting them in the allowable range is preferable.

The wiring electrode 89 having the ultraviolet ray transmitting portions 89a provided therein is formed by the same forming method of the wiring electrode according to the first embodiment. That is, the method of forming the wiring electrode 89 and the ultraviolet ray transmitting portions 89a provided in the wiring electrode 89 is carried out as follows. An aluminum metal film is formed on the second substrate 12 of the completed second substrate 81 by using a method, e.g., a vacuum deposition method, a sputtering method, or an ion plating method. For example, when forming by the vacuum deposition method, a pressure in a chamber of a vacuum deposition machine at the time of deposition is set to $1\times10^{-6}$ to $5\times10^{-5}$ torr ($1.33\times10^{-4}$ to $6.65\times10^{-3}$ Pa) to perform vacuum deposition. Since a thickness is determined based on a deposition time, performing deposition until a necessary thickness is obtained can suffice. Then, a resist film is formed on the aluminum metal film by a method, e.g., screen printing. Subsequently, exposure processing using ultraviolet rays is carried out. In the exposure processing, a positive photographic film having a shape of the wiring electrode 89 with the ultraviolet ray transmitting portions 89a being drawn thereon is mounted on the resist film, and ultraviolet rays are applied from above to execute exposure. The resist film present at the position of the shape of the wiring electrode 89 is hardened based on the exposure, and the resist film present at the position of each ultraviolet ray transmitting portion 89a remains soft without being hardened since it is not irradiated with the ultraviolet ray. Then, the soft resist film present at the position of each ultraviolet ray transmitting portion 89a is dissolved by a dissolving liquid and removed. As a result, the aluminum metal film present at the position of each ultraviolet ray transmitting portion 89a is exposed. The other hardened resist film present at the position where the wiring electrode 89 is formed remains as it is. Then, the exposed aluminum metal film present at the position of each ultraviolet ray transmitting portion 89a is etched by an etchant and removed. As a result, each ultraviolet ray transmitting portion 89a is formed. Subsequently, the hardened resist film present at the position where the wiring electrode 89 is formed is separated by using a separation liquid. Consequently, the wiring electrode 19 having the ultraviolet ray transmitting portion 89a provided therein is brought to completion.

Each pixel electrode unit 13 arranged on the completed second substrate 81 is a pixel electrode unit that uses a TFT element, and a pixel electrode is formed of an ITO film. A structure of this pixel electrode unit 13 is the same as that of the pixel electrode unit according to the first embodiment.

As the polymer dispersed liquid crystal material 25, a liquid crystal material in a PNLC mode that is the same as the liquid crystal material used in the first embodiment is utilized. The polymer material, i.e., the monomer is irradiated with an ultraviolet ray and thereby polymerized to be used.

According to the fourth embodiment, irradiation of the ultraviolet ray is carried out from a direction P indicated by an arrow, i.e., from the completed second substrate 81 side. Since the pixel electrode of each pixel electrode unit 13 on the completed second substrate 81 is formed of a transparent ITO film and each ultraviolet ray transmitting portion 89a is provided in the wiring electrode 89, the monomer that is present in the display region M and the peripheral region N can be polymerized by a single ultraviolet ray applying operation from the completed second substrate 81 side.

According to the fourth embodiment, the wiring electrode 89 is arranged along the full circumference of the display region M that is the peripheral region N. When such a configuration is adopted, static electricity is transmitted to the wiring electrode 89 without static buildup. As a result, an influence of static electricity on the liquid crystal is eliminated, and excellent display without an erroneous operation can be obtained.

Figure 18:
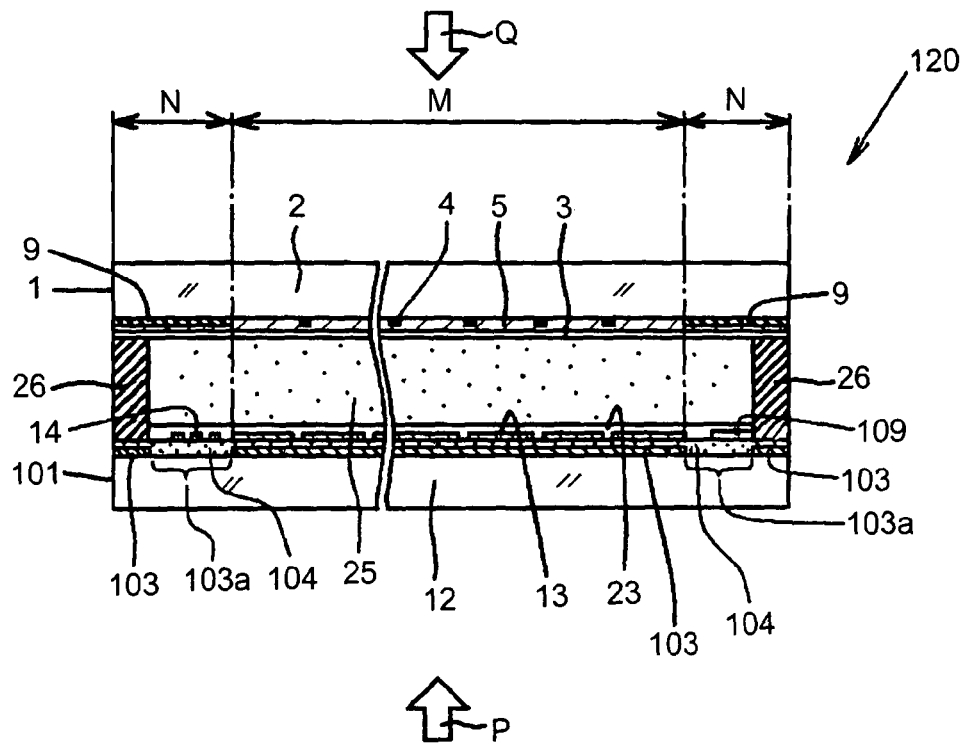
FIG. 18 is a cross-sectional view of a primary part in a display apparatus according to a fifth embodiment of the present invention.
Figure 19:
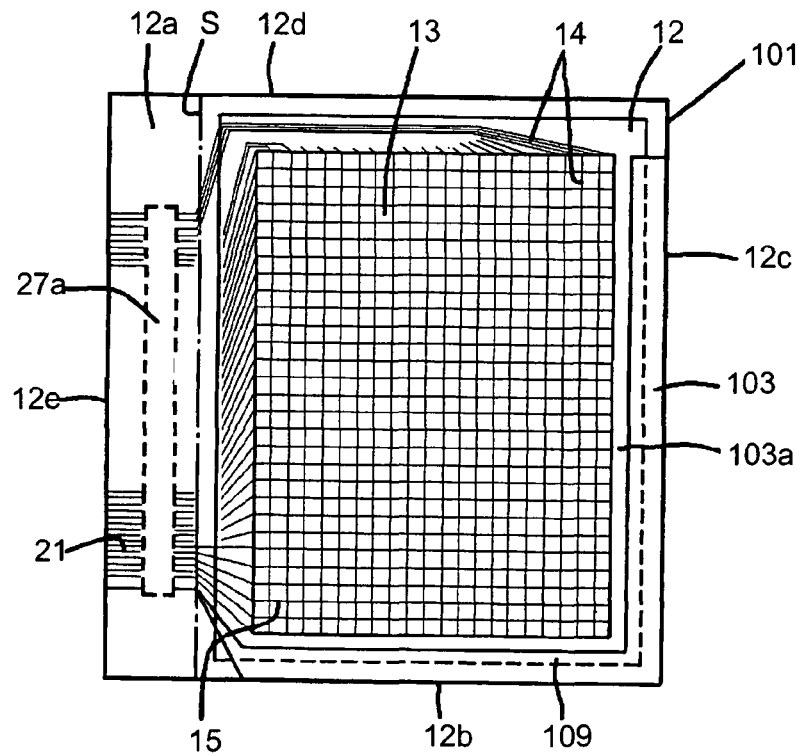
FIG. 19 is a plan view of a completed second substrate in FIG. 18.
Figure 20:
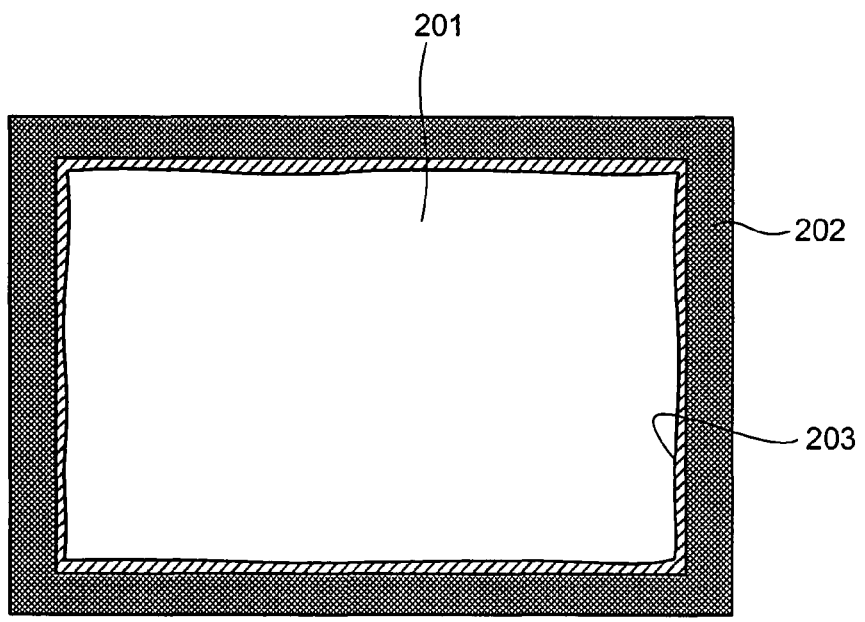
FIG. 20 is a plan view showing a quality phenomenon of a liquid crystal display apparatus according to a conventional technology.

A display apparatus according to a fifth embodiment of the present invention will now be explained with reference to FIGS. 18 and 19. FIG. 18 is a cross-sectional view of a primary part in a display apparatus according to the fifth embodiment of the present invention, and FIG. 19 is a plan view of a completed second substrate depicted in FIG. 18. Like reference numerals denote constituent components having the same specifications as those of the constituent components in the display apparatus according to the first embodiment.

As shown in FIG. 18, a display apparatus 120 according to the fifth embodiment has a structure where the polymer dispersed liquid crystal material 25 in a PNLC mode is encapsulated in a gap between the completed first substrate 1 and the completed second substrate 101 arranged to face each other by using the sealing member 26. Although not depicted in FIG. 18, a transparent spacer, e.g., silica particles or plastic particles is dispersedly arranged to assure a necessary gap amount between the completed first substrate 1 and the completed second substrate 101. The completed first substrate 1 in this example has the same structure as that of the completed first substrate according to the first embodiment. As the polymer dispersed liquid crystal material 25 and the sealing member 26, a material and a member having the same specifications as those of the polymer dispersed liquid crystal material and the sealing member 26 used in the first embodiment are utilized.

As shown in FIG. 18, M denotes a display region, and it is a region where a display image is displayed. N denotes a peripheral region, and a region that is present outside the display region M and adjacent to the display region M is the peripheral region N. The completed first substrate 1 is present on a display image visible side, and the light shielding member 9 having a corner bead function with respect to the peripheral region N of this completed first substrate 1 is arranged along a full circumference of the display region M.

The completed first substrate 1 has the same structure as that of the completed first substrate according to the first embodiment. That is, as shown in FIG. 18, the black matrix 4 is arranged in a reticular pattern in the display region M on a lower surface of the first substrate 2 formed of, e.g., transparent glass, and the light shielding member 9 is arranged in the peripheral region N. The transparent flattening film 5 having an insulating function and a flattening function is arranged on this black matrix 4 or the light shielding member 9, and The first transparent electrode 3 formed of an ITO film is arranged on this flattening film 5.

As shown in FIG. 19, the completed second substrate 101 includes the second substrate 12 formed of, e.g., transparent glass, an extended portion 12a (left part of an alternate long and short dash line) is provided on the outer side 12e of the second substrate 12, and the second substrate 12 is larger than the first substrate 2 of the completed first substrate 1 at this extended portion 12a alone. The attachment portion 27a (part indicated by a chain line in FIG. 19) for attachment of the driving IC is provided on this extended portion 12a. A reflection film 103 is arranged on an upper surface of the second substrate 12 of the completed second substrate 101. This reflection film 103 is arranged in the peripheral region N, and has an ultraviolet ray transmitting portion 103a that allows transmission of an ultraviolet ray provided along the full circumference of the display region M. An insulating film 104 is arranged on the reflection film 103 including the ultraviolet ray transmitting portion 103a. Lattice-like pixel electrode units 13 are arranged in the display region M on this insulating film 104. The part where the pixel electrode units 13 are arranged is the display region M. A wiring pattern for pulling gate electrode lines 14 and signal electrode lines 15 that are collected at a position of the attachment portion 27a for the driving IC through the respective pixel electrode units 13 is arranged in the peripheral region N on the outer side 12d and the outer side 12e of the second substrate 12 adjacent to the display region M. A wiring transparent electrode 109 formed of an ITO film is arranged on the insulating film 104 arranged on the ultraviolet ray transmitting portion 103a of the reflection film 103 and the reflection film 103 provided outside the ultraviolet ray transmitting portion 103a. This wiring transparent electrode 109 is arranged on outer sides 12b and 12c of the second substrate 12, and connected with the first transparent electrode 3 of the completed first substrate 1 via electroconductive particles mixed in the sealing member 26 to achieve electrical conduction. This transparent electrode 109 for the wiring electrode is drawn to the attachment portion 27a for the driving IC. As shown in FIG. 18, a protection insulating film 23 formed of a transparent resin is arranged on each pixel electrode unit 13 in the display region M, the wiring pattern provided in the peripheral region N, and the transparent electrode 109 for the wiring electrode.

The reflection film 103 is formed of an aluminum (Al) metal film, and the aluminum metal film is formed by a method, e.g., a vacuum deposition method, a sputtering method, or an ion plating method, then etching is carried out by a method, e.g., a photo-mask method or a photo-etching method to form the ultraviolet ray transmitting portion 103a. The insulating film 104 arranged on the reflection film 103 is formed by a, e.g., a screen printing method, a roll coater method, or a spinner coating method utilizing a transparent epoxy resin, an acrylic resin, or an urethane resin.

The pixel electrode unit 13 has the TFT element and the pixel electrode, and the pixel electrode is formed of an ITO film. A structure of this pixel electrode unit 13 is the same as that of the pixel electrode unit according to the first embodiment.

As the polymer dispersed liquid crystal material 25, a liquid crystal material in a PNLC mode that is the same material as the liquid crystal material used in the first embodiment is adopted. The polymer material, i.e., the monomer is irradiated with an ultraviolet ray to be polymerized and used.

The sealing member 26 is made of a material obtained by mixing electroconductive particles in a thermosetting resin, e.g., an epoxy resin, and the sealing material 26 having the same specification as that in the first embodiment is used. The electroconductive particle having the same size as that of the spacer (not depicted) arranged in the gap between the completed first substrate 1 and the completed second substrate 101 is used. As the electroconductive particle, one obtained by providing an electroconductive metal coating on a surface of, e.g., a silica particle or a plastic particle is used. When the electroconductive particles are combined with the sealing member 26, electrical conduction is achieved between the first transparent electrode 3 of the completed first substrate 1 and the transparent electrode 109 for the wiring electrode of the completed second substrate 101, and a voltage is applied to the first transparent electrode 3 by the transparent electrode 109 for the wiring electrode. This sealing member 26 is formed by, e.g., a screen printing method.

As shown in FIG. 18, ultraviolet ray irradiation with respect to the thus configured display apparatus is carried out from both a direction indicated by an arrow P and a direction indicated by an arrow Q. The ultraviolet ray irradiation from the direction indicated by the arrow P enables an ultraviolet ray to be transmitted through the ultraviolet ray transmitting portion 103a of the reflection film 104 so that the monomer present in the peripheral region N can be irradiated with the ultraviolet ray to be polymerized, and the ultraviolet ray irradiation from the direction indicated by the arrow Q enables the monomer present in the display region to be irradiated with the ultraviolet ray to be polymerized. The ultraviolet ray irradiation may be simultaneously carried out from the direction indicated by the arrow P and the direction indicated by the arrow Q. In this example, the number of operation steps is small and an operation cost is lowered, but a facility cost of the apparatus is increased. When the method of applying the ultraviolet ray from one side on two stages is adopted, the facility cost can be reduced. When determining which method to be adopted, considering the number of the operation steps, the cost thereof, and the apparatus cost is good.

The display apparatus 120 according to the fifth embodiment has the structure where the reflection film 103 formed of the aluminum metal film is arranged. As a result, image display colors of a display image can be obtained based on an opaque color and a glossy aluminum metal color.

Even in the display apparatus that has the reflection film arranged therein, providing the ultraviolet ray transmitting portion in the reflection film enables application of an ultraviolet ray from the ultraviolet ray transmitting portion, thereby polymerizing the monomer. Further, a quality can be stabilized. Although the fifth embodiment provides the structure where the gap is provided along the full circumference of the display region as the ultraviolet ray transmitting portion, the ultraviolet ray transmitting portion is not restricted to the gap, and small holes may be formed at equal intervals as the ultraviolet ray transmitting portions, for example. The ultraviolet ray transmitting portion may be arranged at an appropriate predetermined position or part rather than the full circumference.

The first to the fifth embodiments are explained in detail above in relation to the display apparatus according to the present invention. The display apparatus according to the present invention can be also applied to a display apparatus that uses a color filter. The present invention can be of course likewise applied to a display apparatus with an illumination device using a light source, e.g., an LED.

What is claimed is:

1. A display apparatus that includes a polymer dispersed liquid crystal material encapsulated between a pair of substrates having opposing electrodes, a display region and a peripheral region in a region where the polymer dispersed liquid crystal is encapsulated, the peripheral region being positioned outside the display region, the display apparatus comprising:
   a wiring electrode having electroconductive and light shielding properties provided in at least a part of the peripheral region on one substrate of the pair of substrates; and
   an ultraviolet ray transmitting portion that allows transmission of an ultraviolet ray provided in the peripheral region where the wiring electrode is provided,
   wherein the ultraviolet ray transmitting portion comprises a plurality of first small holes provided in a part of the wiring electrode,
   wherein the plurality of the first small holes are included within the wiring electrode, and the plurality of the first small holes are disposed in a first region that excludes a second region where a sealing member is disposed.

2. The display apparatus according to claim 1, wherein the plurality of first small holes are dispersed at equal intervals.

3. The display apparatus according to claim 1, wherein the ultraviolet ray transmitting portion is disposed in a necessary gap provided between the display region and the wiring electrode.

4. The display apparatus according to claim 1, wherein a transparent electrode is provided on an upper surface of the wiring electrode.

5. The display apparatus according to claim 1, wherein the wiring electrode provided along a full circumference of the peripheral region.

6. A display apparatus that includes a polymer dispersed liquid crystal material encapsulated between a pair of substrates having opposing electrodes, a display region and a peripheral region in a region where the polymer dispersed liquid crystal is encapsulated, the peripheral region being positioned outside the display region, the display apparatus comprising:
- a wiring electrode having electroconductive and light shielding properties provided in at least a part of the peripheral region on one substrate of the pair of substrates; and
- an ultraviolet ray transmitting portion that allows transmission of an ultraviolet ray provided in the peripheral region where the wiring electrode is provided,
- wherein the ultraviolet ray transmitting portion comprises a plurality of first small holes provided in a part of the wiring electrode,
- wherein a light shielding member having a corner bead function is provided in the peripheral region on the other substrate that opposes the substrate having the wiring electrode provided thereon, and
- the light shielding member is present at a part of the substrate opposing the part where the ultraviolet ray transmitting portion is provided.

7. The display apparatus according to claim 6, wherein the light shielding member has a transmitting unit that transmits the ultraviolet ray therethrough.

8. The display apparatus according to claim 7, wherein the transmitting unit comprises a plurality of second small holes that are partially provided in the light shielding member.

9. The display apparatus according to claim 8, wherein positions of the plurality of the second small holes provided in the light shielding member deviate from and do not overlap positions of the plurality of the first small holes provided in the wiring electrode.

10. The display apparatus according to claim 7, wherein the transmitting unit is formed of a light wavelength selection transmitting member having characteristics of allowing transmission of the ultraviolet ray.

11. The display apparatus according to claim 10, wherein the light wavelength selection transmitting member is formed of a dielectric multilayer film.

12. A display apparatus in which a polymer dispersed liquid crystal material is encapsulated between a pair of substrates having opposing electrodes, a display region and a peripheral region of the display apparatus disposed in a region where the polymer dispersed liquid crystal material is encapsulated, and the peripheral region of the display apparatus is disposed outside the display region, the display apparatus comprising:
- a wiring electrode which shields light, the wiring electrode disposed directly on one substrate among the pair of the substrates, and the wiring electrode at least partially disposed in the peripheral region of the one substrate; and
- an ultraviolet ray transmitting portion comprising a plurality of first holes penetrating through the wiring electrode,
- wherein the plurality of the first holes are disposed in a first region that does not overlap a second region where a sealing member is disposed.

* * * * *